(12) United States Patent
Abhishek Raja

(10) Patent No.: US 11,314,509 B2
(45) Date of Patent: Apr. 26, 2022

(54) PROCESSING OF PLURAL-REGISTER-LOAD INSTRUCTION

(71) Applicant: Arm Limited, Cambridge (GB)

(72) Inventor: Abhishek Raja, Austin, TX (US)

(73) Assignee: Arm Limited, Cambridge (GB)

( * ) Notice: Subject to any disclaimer, the term of this patent is extended or adjusted under 35 U.S.C. 154(b) by 99 days.

(21) Appl. No.: 16/823,695

(22) Filed: Mar. 19, 2020

(65) Prior Publication Data
US 2021/0294607 A1    Sep. 23, 2021

(51) Int. Cl.
| | |
|---|---|
| *G06F 9/312* | (2018.01) |
| *G06F 8/00* | (2018.01) |
| *G06F 9/30* | (2018.01) |
| *G06F 8/41* | (2018.01) |
| *G06F 9/38* | (2018.01) |

(52) U.S. Cl.
CPC ...... *G06F 9/30043* (2013.01); *G06F 9/30134* (2013.01); *G06F 8/433* (2013.01); *G06F 9/3838* (2013.01); *G06F 2209/521* (2013.01)

(58) Field of Classification Search
CPC ............. G06F 9/30043; G06F 9/30134; G06F 9/3838; G06F 9/52; G06F 9/522; G06F 9/524; G06F 9/526; G06F 9/528; G06F 9/5066; G06F 2209/521; G06F 8/433; G06F 9/3842; G06F 9/3855
USPC ......................................... 712/225, 216–219
See application file for complete search history.

(56) References Cited

U.S. PATENT DOCUMENTS

| | | | | |
|---|---|---|---|---|
| 2004/0193844 A1* | 9/2004 | Thimmannagari | ... | G06F 9/3838 712/209 |
| 2012/0124325 A1* | 5/2012 | Kaplan | ................ | G06F 9/3004 711/207 |
| 2013/0117546 A1* | 5/2013 | Jacobi | ................ | G06F 9/30087 712/225 |
| 2014/0075163 A1* | 3/2014 | Loewenstein | ......... | G06F 12/084 712/225 |
| 2017/0293567 A1* | 10/2017 | Bryant | ............... | G06F 12/0815 |

* cited by examiner

*Primary Examiner* — Daniel H Pan
(74) *Attorney, Agent, or Firm* — Nixon & Vanderhye P.C.

(57) ABSTRACT

An apparatus comprises processing circuitry to issue load operations to load data from memory. In response to a plural-register-load instruction specifying at least two destination registers to be loaded with data from respective target addresses, the processing circuitry permits issuing of separate load operations corresponding to the plural-register-load instruction. Load tracking circuitry maintains tracking information for one or more issued load operations. When the plural-register-load instruction is subject to an atomicity requirement and the plurality of load operations are issued separately, the load tracking circuitry detects, based on the tracking information, whether a loss-of-atomicity condition has occurred for the load operations corresponding to the plural-register-load instruction, and requests re-processing of the plural-register-load instruction when the loss-of-atomicity condition is detected.

19 Claims, 11 Drawing Sheets

PROCESSING OF PLURAL-REGISTER-LOAD INSTRUCTION

BACKGROUND

Technical Field

The present technique relates to the field of data processing.

Technical Background

A data processing apparatus may have processing circuitry which supports at least one type of load instruction for loading a destination register with data obtained from a memory location corresponding to a certain target address. Some processing architectures may support a load instruction which specifies more than one destination register, so that one instruction causes a number of different destination registers to be loaded with data from respective target addresses.

SUMMARY

At least some examples provide an apparatus comprising: processing circuitry to issue load operations to load data from memory, where in response to a plural-register-load instruction specifying a plurality of destination registers to be loaded with data from respective target addresses, the processing circuitry is configured to permit a plurality of load operations corresponding to the plural-register-load instruction to be issued as separate load operations; and load tracking circuitry configured to maintain tracking information for one or more issued load operations; in which: when the plural-register-load instruction is subject to an atomicity requirement and the plurality of load operations are issued as separate load operations, the load tracking circuitry is configured to: detect, based on the tracking information, whether a loss-of-atomicity condition has occurred for the plurality of load operations corresponding to the plural-register-load instruction, the loss-of-atomicity condition comprising a condition indicative of a risk that, between processing of an earlier processed load operation and processing of a later processed load operation of the plurality of load operations, data associated with an address of the earlier processed load operation has changed; and request re-processing of the plural-register-load instruction when the loss-of-atomicity condition is detected.

At least some examples provide a data processing method comprising: in response to a plural-register-load instruction specifying a plurality of destination registers to be loaded with data from respective target addresses, issuing a plurality of load operations corresponding to the plural-register-load instruction, using processing circuitry which permits the plurality of load operations to be issued as separate load operations; and maintaining tracking information for one or more issued load operations; in which: when the plural-register-load instruction is subject to an atomicity requirement and the plurality of load operations are issued as separate load operations, the method comprises: detecting, based on the tracking information, whether a loss-of-atomicity condition has occurred for the plurality of load operations corresponding to the plural-register-load instruction, the loss-of-atomicity condition comprising a condition indicative of a risk that, between processing of an earlier processed load operation and processing of a later processed load operation of the plurality of load operations, data associated with an address of the earlier processed load operation has changed; and requesting re-processing of the plural-register-load instruction when the loss-of-atomicity condition is detected.

Further aspects, features and advantages of the present technique will be apparent from the following description of examples, which is to be read in conjunction with the accompanying drawings.

DESCRIPTION OF EXAMPLES

Figure 1:
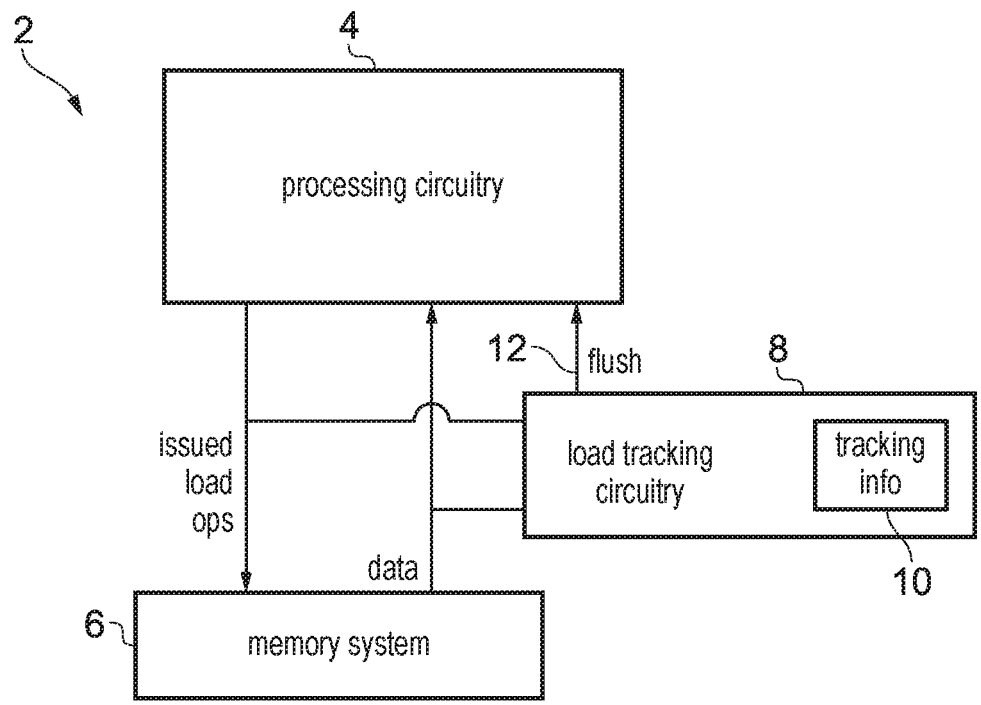
FIG. 1 schematically illustrates an example of a data processing apparatus having processing circuitry and load tracking circuitry.

A data processing apparatus may have processing circuitry to issue load operations to load data from memory. The processing circuitry may support a plural-register-load instruction which specifies a plurality of destination registers (e.g. the number of destination registers could be two, or could be more than two). In response to the plural-register-load instruction, the processing circuitry issues load operations such that each of the two or more destination registers is loaded with data from a respective target address.

A program instruction may be subject to an atomicity requirement, which may require that when the instruction is executed on one processing element, then the effects of the instruction seen by other instructions on the same processing element or on another processing element should either reflect that none of the effects of the instruction on the first processing element have occurred, or should reflect that all of the effects of that instruction have occurred. When atomicity is required, it should not be possible that other instructions should be able to see architectural state or data in memory which reflects only part of the effects of the instruction. Such atomicity may be important in some scenarios for ensuring that processing results of a certain set of software are predictable and reliable. This may be particularly important if there are a number of different processing elements interacting with shared data in parallel.

Hence, if the plural-register-load instruction is subject to an atomicity requirement, it may be desirable that the load operations for loading the respective destination registers of the plural-register-load instruction are performed such that from the point of view of any other observer, those loads have the same effect as if those loads had been performed at a single instant of time without any intervening change to the loaded data between those load operations. This does not necessarily require that the loads are actually performed at the same instant in time, just that the effect of the instruction should be the same as if the loads had been performed simultaneously.

One way of ensuring that the atomicity requirement is observed for the plural-register-load instruction could be to treat the instruction as triggering a single load request to memory which returns all of the respective pieces of data for the respective target addresses over several different result buses, so as to invoke circuitry for writing each respective piece of data to a different destination register. However, while this approach would make monitoring whether the atomicity requirement is observed relatively simple, it may require sufficient load bandwidth to be reserved in the same processing cycle to be able to handle returning the data for each of the destination registers within the same cycle, which may typically require reserving a certain number of load pipelines in parallel within the same cycle. Hence, if there is insufficient load bandwidth to be able to deal with all of the loaded data portions corresponding to each of the destination registers of the plural-register-load instruction in the same cycle, then processing of the instruction would have to be delayed until a subsequent cycle. While spare load bandwidth which is insufficient to use for a plural-register-load instruction could be reused for another type of (single destination register) load instruction, in some processing workloads (such as memread or memcpy) it may be that the majority of load operations are issued as plural-register-load instructions, and so there may be no single load operations available to fill any spare bandwidth which is insufficient to handle a plural-register-load instruction. This means that a relatively large fraction of the available load bandwidth supported in hardware may not be usable for such workloads, hence harming performance.

Hence, in the examples discussed below, the processing circuitry may permit the load operations corresponding to the plural-register-load instruction to be issued as separate load operations. This means that even if there is not enough bandwidth in a given processing cycle to process all of the loads needed for the plural-register-load instruction, it is possible to issue just one or more of the load operations in one cycle and then leave other load operations for a different cycle. This approach may be seen as counter intuitive for a plural-register-load instruction subject to an atomicity requirement as issuing the load operation separately (possibly in different processing cycles) could be seen as causing a risk of loss of atomicity as it might be possible that the data associated with an earlier-issued load operation may change before the later-issued load operation is processed, so that the effects of the instruction are not atomic with respect to other instructions being executed in the processing system.

However, the inventors recognise that load tracking circuitry can be provided to maintain tracking information for one or more issued load operations, which can be used to detect whether any loss of atomicity has occurred for the plural-register-load instruction. While the maintenance and checking of this tracking information may incur some additional overhead in terms of power and circuit area, this can help to support much better utilisation of available load bandwidth for handling workloads where a significant number of the loads to be performed are plural-register-load instructions.

Hence, when the plural-register-load instruction is subject to the atomicity requirement and the load operations corresponding to the plural-register-load instruction are issued separately, the load tracking circuitry may detect, based on the tracking information, whether a loss-of-atomicity condition has occurred for the plurality of load operations corresponding to the plural-register-load instruction, the loss-of-atomicity condition comprising a condition indicative of a risk that, between processing of an earlier processed load operation and processing of a later processed load operation of the plurality of load operations, data associated with an address of the earlier processed load operation has changed. The load tracking circuitry may request re-processing of the plural-register-load instruction when the loss-of-atomicity condition is detected.

Hence, with this approach atomicity can be enforced while still allowing load bandwidth to be used efficiently, as loads corresponding to the plural-register-load instruction can be handled even if there is insufficient bandwidth in one cycle to handle all of the loads for the same plural-register-load instruction. Also, this approach can allow the circuit hardware associated with controlling reserving of multiple load pipelines in response to a single load to be eliminated (if desired for some implementations—as described below other implementations may still provide this circuitry to support a non-cracked mode).

It will be appreciated that although the processing circuitry is configured so that it is capable of issuing the load operations corresponding to the plural-register-load instruction across separate processing cycles (e.g. as separate micro-operations or instructions), the processing circuitry need not always do this. For example while the different load operations for the same plural-register-load instruction could be issued separately across different processing cycles if there is insufficient bandwidth in one cycle to handle all of the loads, in other scenarios if there is enough bandwidth that all of the loads can be issued within the same cycle then it may be beneficial to do so as it will make it less likely that data associated with the respective load operations may change in the time that the load operations are being processed (so that it is less likely that the plural-register-load instruction needs to be reprocessed later on, which can help to improve performance). Hence, the issuing of the load operations separately could be either in parallel or in separate processing cycles, for example depending on current bandwidth available in any given cycle.

If, based on the tracking information, the tracking circuitry detects that the loss-of-atomicity condition has occurred, then when re-processing of the plural-register-load instruction is requested, the load tracking circuitry could also request that any younger instructions (in program order)

than the plural-register-load instruction are also re-processed. For example the re-processing could be implemented by flushing a processing pipeline of the processing circuitry, to discard any operations corresponding to the plural-register-load instruction or younger instructions (instructions which in the original program order occurred after the plural-register-load instruction), and then the processing circuitry could be requested to resume processing form an instruction address corresponding to the plural-register-load instruction.

The load tracking circuitry may detect occurrence of the loss-of-atomicity condition when a coherency snoop request specifying a snoop address corresponding to the address of the earlier processed load operation is detected between processing the earlier processed load operation and processing of the later processed load operation. Often, in systems where enforcement of atomicity is important, this may be a multi-processor system where a coherency mechanism is provided to maintain coherency between cached data at the respective processing elements. Such a coherency mechanism may be based on a snooping scheme where a request from one processing element to read or write shared data may, depending on the current coherency state of that data, trigger snoop requests to be sent to other processing elements. A snoop request may request invalidation of locally cached copies of data from the same address at that other processing element, and/or request a snoop response depending on the coherency state of any data cached for that address at the other processing element. Such snoop requests may therefore be used as an indication that it is possible that data from the address could have changed, and so if such a coherency snoop request is received for the address of the earlier processed load operation associated with the plural-register-load instruction, then this could be detected as a sign that the lost-of-atomicity condition may have arisen. It will be appreciated that the receipt of the coherency snoop request may not necessarily indicate that data associated with the address of the earlier process load operation has actually changed. In some cases some level of conservatism may be implemented so that the coherency snoop request could be detected as a signal of potential loss-of-atomicity even if no actual change to data has occurred. Also, in some cases only certain types of coherency snoop requests could be detected as a sign of loss-of-atomicity, so in some cases other types of coherency snoop requests may not trigger the detection of the loss-of-atomicity condition. The particular rules as to which coherency snoop requests should trigger loss of atomicity detection may depend on the particular coherency scheme implemented for a given system.

The tracking information maintained by the load tracking circuitry could have various forms and may, for example, indicate whether a coherency snoop request has been detected corresponding to an address of a processed load operation.

In one example, the tracking information may be maintained within a tracking structure which comprises one or more tracking entries. Each tracking entry may correspond to a given processed load operation and may specify at least an instruction identifier associated with that processed load operation, an address of the processed load operation, and a hazard indication indicating whether a hazard condition has been detected for the processed load operation. The instruction identifier may be set such that it is possible to determine based on the instruction identifier whether a given load operation is younger or older than the processed load operation associated with that instruction identifier. For example instruction identifiers could be allocated to processed instructions in age order. Here age refers to the position of the instruction within the program order (the order in which the instructions are defined within memory, e.g. by a programmer or a compiler which generated the code being executed). An older instruction is an instruction which occurs earlier within the program order and a younger instruction is an instruction which occurs later in the program order.

Such tracking information can be used to track whether loss-of-atomicity has occurred for the plural-register-load instruction.

When the plural-register-load instruction is processed with the respective load operations issued separately, the processing circuitry may allocate the same instruction identifier to each of the two or more load operations corresponding to the plural-register-load instruction. This makes it simpler for the load tracking circuitry to track the respective load operations corresponding to the same plural-register-load instruction. In systems supporting virtual-to-physical address translation, using the same instruction identifier for the respective parts of the plural-register-load instruction can also help ensure that translation requests made in response to the plural-register-load instruction (which may also be tracked based on instruction identifier) can be handled using the same translation which can help provide a guarantee of atomicity. While, for the purpose of tracking in the tracking structure or address translation handling, the same instruction identifier may be allocated to each of the load operations associated with the same plural-register-load instruction, it is possible to also allocate an additional identifier to the load operations to distinguish between the different load operations for the same plural-register-load instruction. This additional identifier could be used, for example, to control checking of whether each of the load operations has completed/committed. However, this additional identifier need not be used for the tracking of the load operations in the tracking structure.

The load tracking circuitry may allocate a tracking entry in the tracking structure for a given load operation corresponding to the plural-register-load instruction, in response to processing of the given load operation. For example, when the first of any of the individual load operations corresponding to the plural-register-load instruction is processed, a new entry can be allocated in the tracking structure. It does not matter which of the different load operations for the plural-register-load instruction is executed first. The new tracking entry in the tracking structure may be allocated in response to any of the individual loads corresponding to the different chunks of data to be loaded in response to the same plural-register-load instruction. For subsequently processed loads of the plural-register-load instruction, a new tracking entry could also be allocated (e.g. if the address of that load extended to an address in a different cache line, which may therefore be hazarded separately against addresses of snoops). Alternatively, if the subsequently processed load relates to an address in the same cache line as an earlier load for the same plural-register-load instruction it may not be necessary to allocate a new tracking entry.

The load tracking circuitry may set the hazard indication for a given tracking entry of the tracking structure to indicate that the hazard condition has been detected, in response to detecting a coherency snoop request specifying a snoop address which corresponds to the address specified by that given tracking entry. In determining whether to set the hazarding indication, some implementations may impose one or more further criteria on the coherency snoop request (e.g. only setting hazard indication in response to certain types of coherency snoop request as discussed above), while other implementations could set the hazard indication if the snoop address corresponds to the address specified by the given tracking entry, regardless of the particular type of coherency snoop request.

The snoop address may be considered to correspond to the address specified by the given tracking entry if at least part of the portion of data referred to by the snoop address overlaps with at least part of the portion of data associated with the address specified by the given tracking entry. This does not necessarily mean that the data whose change triggered the coherency snoop request to be issued is necessarily the same as the data which would have been loaded by the processed load operation indicated by the given tracking entry. For example, in some systems snoop requests may specify addresses at a granularity of a certain size called a cache line, which may be larger than the byte-level granularity with which individual load operations can request access to data, so it is possible that although a given load operation which caused the given tracking entry to be allocated might have been requesting loading of one part of a cache line, the operation which triggered the coherency snoop request to be issued for the same cache line may actually have updated a different portion of the cache line and may not have updated the portion required by the load of a given tracking entry. However, due to limitations of the granularity with which coherency snoop requests specify addresses, it may not be detectable that these requests would actually have used different portions of data and so the hazard condition may nevertheless be detected. Hence, it will be appreciated that in some cases the addresses indicated in entries of the tracking structure may be specified at a coarser granularity than the addresses which can be specified by the load operations themselves, and there may be a certain amount of conservatism in determining whether a hazard has occurred.

If the hazard indication is set for a given tracking entry, then this does not necessarily mean that loss-of-atomicity has definitely occurred. For example, it maybe that the coherency snoop request was only detected after all of the individual load operations for the same plural-register-load instruction had already been processed, in which case the operation which triggered the coherency snoop request would not affect the atomicity of the plural-register-load instruction. The setting of the hazard indication may only be considered a problem if it is detected that at least one further load operation is encountered which relates to the same instruction as the earlier processed load operation indicated in the tracking entry having the hazard indication set.

Hence, the load tracking circuitry may, in response to processing of a given load operation corresponding to the plural-register-load instruction associated with a given instruction identifier, check whether the tracking structure already includes the tracking entry specifying the same given instruction identifier, for which the hazard indication in that tracking entry already indicates that the hazard condition has been detected. When the tracking structure is detected as already including a tracking entry specifying the given instruction identifier for which the hazard indication is set to indicate that the hazard condition has been detected, then the load tracking circuitry detects this as an occurrence of the loss-of-atomicity condition, and therefore can then trigger the request for re-processing of the plural-register-load instruction.

In some implementations the tracking structure used for detecting the loss-of-atomicity condition may be a dedicated tracking structure for atomicity enforcement, so need not be used for any other purpose.

However, in other examples the tracking structure may be shared with other functions so that each tracking entry can also be used to detect other conditions which may require certain actions to be performed in respect of load operations issued by the processing circuitry.

For example, in some processor architectures, certain memory ordering requirements may be imposed on load operations by the system architecture. Such memory ordering requirements may constrain the relative order in which load operations are to be performed relative to other operations or instructions. Such memory ordering requirements may include, for example, memory barriers which may require that loads younger than the barrier are not performed ahead of loads that are older than the barrier. Another example of a memory ordering requirement may be an architectural rule that requires loads from the same address in memory to be carried out in an order corresponding to the program order of the corresponding load instructions.

One way of accounting for memory ordering requirements such as these could be to ensure that load operations are issued in an order which agrees with the memory ordering requirements. However, this may have an impact on performance, because if an earlier load is stalled, this may also stall other loads which the memory ordering requirement constrains to being performed after the earlier load.

In practice, it has been realised that issuing load operations in an order which disagrees with one or more memory ordering requirements may be allowable, provided that the result of the load operations is not altered due to the re-ordering. Doing so can improve performance because it means that if one load stalls, a later load can be issued in its place—even if the memory ordering requirement would not allow this.

When issuing load operations in this way, in at least one mode of operation, it may be useful to be able to track issued load operations to identify whether they have been issued in disagreement with any memory ordering requirements defined by the system architecture; and to track whether the disagreement with the memory ordering requirement is problematic. To do this, memory ordering tracking storage circuitry can be provided, such as a read-after-read (RAR) buffer, which may have entries which can record information on issued load operations, allowing previously issued load operations to be monitored.

In some implementations the tracking information maintained by the load tracking circuitry for enforcing the atomicity requirement may be the same tracking information used to detect violation of memory ordering requirements, such as the RAR buffer described above.

Hence, in some examples the load tracking circuitry may use the tracking information to determine whether at least one load operation has been issued in disagreement with a memory ordering requirement; and when it is determined that the at least one load operation has been issued in disagreement with the memory ordering requirement, whether to re-issue one or more issued load operations or to continue issuing load operations despite disagreement with the memory ordering requirement. By reusing the same tracking structure for enforcing atomicity requirements as well as for enforcing memory ordering requirements, this saves circuit area and reduces power consumption.

The tracking structure may comprise tracking entries specifying at least an instruction identifier, an address and a hazard indication as discussed earlier for the tracking of the loss-of-atomicity. However, for tracking of memory ordering requirements the same information may be used as follows. In response to processing of a given load operation associated with a given instruction identifier identifying a given instruction, the load tracking circuitry may detect a memory ordering violation when the tracking structure includes a hazarding entry for which: the instruction identifier specified by the hazarding entry corresponds to a younger instruction than the given instruction; the address specified by the hazarding entry corresponds to the address of the given load operation; and the hazard indication specified by the hazarding entry indicates that the hazard condition has been detected. Also, in response to the processing of a barrier instruction associated with a given instruction identifier, a memory ordering violation may be detected when the tracking structure includes a hazarding entry for which the instruction identifier specified by the hazarding entry corresponds to a younger instruction than the barrier instruction, and the hazard indication specified by the hazarding entry indicates that the hazard condition has been detected.

Hence, while for enforcement of atomicity the load tracking circuitry is checking for hazard occurring between respective load operations associated with the same instruction identifier, for the memory ordering violation detection the load tracking circuitry is checking for hazards which occur for an entry associated with a younger instruction which is processed before an older load or barrier instruction, which may be an indication of a violation of the memory ordering requirement.

The response taken when a violation is detected may be slightly different depending on whether the violation is a memory ordering violation or a loss-of-atomicity violation. When the memory ordering violation is detected, the load tracking circuitry may request that the processing circuitry re-processes at least the younger instruction identified by the instruction identifier specified by the hazarding entry and one or more subsequent instructions younger than that younger instruction, but may permit processing to continue without re-issuing the given instruction whose load operation caused the hazarding entry for the younger instruction to be detected. In contrast, if the loss-of-atomicity condition is detected then the given load operation whose processing led to the detection of loss-of-atomicity may itself be re-processed, not just instructions which are younger than the given load instruction. Hence, to support the use of the tracking structure for handling loss-of-atomicity, a command may be supported which requests re-processing of instructions including the instruction corresponding to the current load being processed, whereas for memory ordering violation detection it may be sufficient to have a command which requests that any younger instructions than the currently processed load operation are re-processed.

An atomicity data buffer can be provided which supports processing the load operations of the plural-register-load instruction in an "atomicity-buffering" mode. When the load operations for the plural-register-load instruction are issued as separate load operations and processed in the atomicity-buffering mode: in response to the earlier processed load operation, the processing circuitry may load at least one data word which comprises a first portion required for processing of the earlier processed load operation and a second portion required for processing of the later processed load operation, and to allocate the second portion into the atomicity data buffer; and in response to the later processed load operation which requires the second portion, the processing circuitry is configured to obtain the second portion from the atomicity data buffer. This approach means that, as the respective portions of data needed for the earlier and later processed load operations are loaded at the time of processing the earlier processed load operation, it is simpler to ensure atomicity as even if a hazarding snoop request is detected after processing the earlier processed load operation and before processing the later processed load operation, it is not necessary to trigger re-processing of the instruction as the overall effect of the plural-register-load instruction may be the same as if it was completely processed before any change to the data which caused the snoop request to be issued. Hence, when the loads of a plural-register-load instruction are processed in the atomicity-buffering mode, it is not essential to trigger re-processing of the plural-register-load instruction based on the tracking information as discussed above.

In practice, it may not be practical to use the atomicity-buffering mode for all plural-register-load instructions. For workloads where many plural-register-load instructions are expected, this would require a very large atomicity buffer size to be provided in hardware, which may not be considered justified given the associated circuit area and power costs.

Therefore, in some implementations, the atomicity-buffering mode may be restricted for use only for some instructions. For example, to provide a stronger guarantee that forward progress can be made even if there are frequent snoop requests expected for data addresses involved in processing plural-register-load instructions, one approach could be to use the atomicity-buffering mode for cases when the plural-register-load instruction becomes the oldest remaining instruction to be processed, but not to use the atomicity-buffering mode for other instructions. In other examples, the oldest X instructions (where X is 2 or more) could, if they include a plural-register-load instruction, be processed according to the atomicity-buffering mode, but any loads issued for instructions other than the oldest X instructions could processed not in the atomicity-buffering mode. Hence, in some examples the processing circuitry may process the plurality of load operations corresponding to the plural-register-load instruction in the atomicity-buffering mode when the plurality of load operations include an oldest pending load operation remaining to be processed. For any plural-register-load instructions not processed in the atomicity-buffering mode, the tracking information can be used to detect loss of atomicity as discussed above, but for instructions processed in the atomicity-buffering mode the loss-of-atomicity tracking using the tracking information is not needed. By restricting use of the atomicity-buffering mode to selected instructions including at least the oldest pending loads, this can provide a better balance between circuit hardware costs and providing a guarantee of forward progress.

The techniques discussed above could be applied to a plural-register-load instruction which supports loading of the destination registers such that the respective target addresses for the different destination registers correspond to non-contiguous blocks of address space. For example, the plural-register-load instruction could specify a list of offsets which may take different non-consecutive values to identify non-contiguous offsets of the respective target addresses relative to a common base address.

However, in some implementations the encoding of the plural-register-load instruction may be such that the respective target addresses are addresses of contiguous blocks of address space. In this case it may not be necessary to explicitly encode each separate respective target address in the encoding of the plural-register-load instruction. For example, the address operands on the plural-register-load instruction could specify the address of the first block of address space required for the plural-register-load instruction, and then the remaining target addresses may implicitly be assumed to follow on from the target address of that first block in consecutive regions of memory address space. It will be appreciated that some forms of plural-register-load instruction may support variable size blocks of address space, with the instruction opcode or a size parameter identifying the size of each block.

As discussed above, for efficient use of load bandwidth it can be useful to support the ability to issue the load operations corresponding to the plural-register-load instruction as separate load operations which are allowed to be issued in separate processing cycles if this is deemed more efficient. However, it is not essential that the operations corresponding to the plural-register-load instruction need always be issued separately. While there may be some implementations which always issue separate load operations corresponding to the plural-register-load instruction, other implementations may support different modes of processing the plural-register-load instruction.

For example, the processing circuitry may support a cracked mode of processing the plural-register-load instruction, in which the processing circuitry is configured to crack the plural-register-load instruction into the plurality of load operations to be issued as separate load operations; and a non-cracked mode of processing the plural-register-load instruction, in which the processing circuitry is configured to: issue, in response to the plural-register-load instruction, a single load operation to load a combined block of data, the combined block of data including portions of data to be loaded to each of the destination registers of the plural-register load instruction; and allocate a plurality of load-data-returning paths (e.g. load result buses) for use in response to the single load operation, each of the plurality of load-data-returning paths allocated for returning the data required to be loaded to a respective one of the destination registers.

The cracked mode of processing may correspond to the processing of the form discussed above where separate load operations are issued for the plural-register-load instruction, which can support more efficient use of load bandwidth in some scenarios. However, the non-cracked mode of processing can make enforcement of atomicity simpler because it means that (as the instruction is being processed using a single combined load operation) then there is less risk of data changing between the processing of the respective loads. Hence, by supporting both the cracked mode and a non-cracked mode, this can provide flexibility to vary the approach taken for the plural-register-load instruction depending on properties of the currently processed workload. The non-cracked mode can be particularly useful in systems which define the plural-register-load instruction such that the addresses referenced for the different destination registers are addresses of contiguous blocks of address space, as in this case the instruction could more efficiently be dealt with using a single load operation to load a combined block of data. For example, some processing systems may support loads which load blocks of different sizes and it may be that a plural-register-load instruction for which the contiguous blocks of address space correspond to a smaller size can be mapped to a single load operation which specifies one of the larger sizes supported by the system. Nevertheless, even in systems where plural-register-load instructions may support addressing of discontiguous blocks of address space this could still be dealt with using a single load operation if the system supports enable/disable indications in the load operation which can indicate which portions of a block of data of a certain size are to be loaded.

In some examples which support both the cracked mode and the non-cracked mode of processing, the selection of the current mode could be based on a control parameter in a control register or other storage element of the processing apparatus. In some cases the mode selected could be statically configured at boot time, or alternatively it may be possible to dynamically select the current mode of processing at run time based on events occurring during the processing of instructions. For example, some systems may support an explicit mode switching instruction which instructs the processing circuitry to switch between the cracked mode and the non-cracked mode.

However, in other systems it may be useful to provide performance monitoring circuitry which monitors some aspect of processing performance and selects the cracked mode or the non-cracked mode depending on whether the performance monitoring data gathered for the program being executed meets a predetermined condition.

For example, the apparatus may have counting circuitry which counts a number of occurrences of the loss-of-atomicity condition when the processing circuitry is in the cracked mode. The counting circuitry may request that the processing circuitry switches to the non-cracked mode when the number of occurrences of the loss-of-atomicity condition exceeds or reaches a given threshold. If the loss-of-atomicity condition keeps being detected then this may be a sign that there is a relatively high level of interaction between different processing workloads executing on the system which make it more frequent that there are hazards detected associated with the loads for a given plural-register-load instruction, and so continuing to attempt to use the cracked mode of processing may harm performance if the instruction keeps having to be re-processed due to detected loss of atomicity. Hence, once the number of occurrences of the loss-of-atomicity condition reaches a predetermined threshold it may be more efficient to use the non-cracked mode which, even if this decreases the utilisation of available load bandwidth for a time, enables forward progress to be made.

In some cases the request to switch the non-cracked mode when the loss-of-atomicity condition exceeds or reaches a given threshold could be generated automatically in hardware once the count of occurrences of the loss-of-atomicity condition reaches the threshold. However, in other examples the count of the number of occurrences of loss-of-atomicity may be recorded in a storage element accessible to software, and software may read the count value and trigger the mode switch when required.

In other examples, other types of performance monitoring data could be used to select whether the cracked mode or non-cracked mode is used. For example, a count of the number or fraction of load operations which are triggered by plural-register-load instructions could be used. If there are not many plural-register-load instructions and the majority of loads are triggered by single load instructions then it may be preferred to use the non-cracked mode as in this case there is less of a problem with inefficient bandwidth utilisation because a single load could be accommodated within the spare bandwidth even if there is insufficient load bandwidth for dealing with a plural-register-load instruction. Hence, in this case use of the non-cracked mode may be preferred because this makes it less likely that plural-register-load instructions need to be reissued. However, if the majority of load operations are plural-register-load instructions then the cracked mode may be preferred. Hence, in some cases the mode selection circuitry may make the selection depending on whether an indication that the number or relative fraction of loads which correspond to plural-register-load instructions is greater than a certain threshold, or alternatively this may be handled in software based on a count value made accessible to the software by hardware similar to the count of the number of occurrences of loss-of-atomicity described above.

In other examples, whether the cracked mode or non-cracked mode of processing is used for a given plural-register-mode instruction may depend on the available load bandwidth at the time of processing the plural-register-load instruction. For example if the non-cracked mode is supported then it may be used if there is sufficient bandwidth available for processing all loads of the plural-register-load instruction using a single load request in the same cycle (e.g. with result buses reserved in multiple pipelines as discussed above), but if there is insufficient bandwidth then the cracked mode may be used instead.

Alternatively, to reduce the complexity of the processing hardware, other implementations may support only the cracked mode and may not support the non-cracked mode. Hence, there is a design choice for the designer of a particular processor micro-architecture to trade off performance against implementation cost, power consumption and circuit area.

Regardless of whether the non-cracked mode is supported or not, for the cracked mode the cracking of the plural-register-load instruction into the separate load operations may be performed at different stages of the processing pipeline. For example, the processing circuitry may be configured to crack the plural-register-load instruction into the plurality of load operations at one of: a decode stage to decode the plural-register-load instruction, or an issue stage to issue load operations for processing.

In some processors with multiple processing elements, it may be useful to support a synchronisation request sent from one processing element to another to request confirmation that a certain event has occurred. For example, a synchronisation request may be sent when page table data used for address translation and/or memory protection is changed, so that when a request is made to invalidate any out of date page table data from translation lookaside buffers, a synchronisation request can also be issued and a synchronisation response can be returned once any instructions using old translations have completed and the invalidation has been carried out. Another example of a synchronisation request may be associated with a memory barrier operation which requires that no memory access request received after the memory barrier is re-ordered to be processed ahead of memory access requests received before the memory barrier, in which case it may be useful to use a synchronisation request to request that other processing elements confirm when memory operations older than the barrier are complete. Hence, there may be a range of types of synchronisation request supported, but in general in response to a synchronisation request requesting confirmation that a predetermined event has occurred, the processing circuitry may provide a synchronisation response when the predetermined event has occurred.

When a synchronisation request is received between processing of the earlier processed load operation processing of the later processed load operation for a plural-register-load instruction subject to an atomicity requirement, the processing circuitry may defer providing the synchronisation response until after the later processed load operation has been processed. This can help to enforce atomicity of the plural-register-load instruction, as it makes it less likely that page table data (or other data which another processing element will change once the synchronisation response has been received from the processing circuitry) will change in between processing of the earlier and later processed load operations.

The techniques discussed above can be applied to any plural-register-load instruction which requests that two or more different destination registers are loaded with data from respective target addresses. For example, the instruction could be a load-multiple instruction which specifies a list of destination registers to be loaded with data from respective target addresses. The load-multiple instruction could specify a fixed number, or a variable number, of destination registers.

However, in some examples the plural-register-load instruction may be a load-pair instruction for which the number of destination registers is two. For a load-pair instruction, the instruction encoding may be more efficient than for a load-multiple instruction supporting a larger number of destination registers. For example the load-pair instruction could have sufficient encoding bit space within the instruction encoding for encoding the two destination registers explicitly using separate destination register identifiers.

The technique discussed above can be particularly useful for processing circuitry which has a certain number, N, of load pipelines for processing load operations in parallel, where N is an odd integer greater than or equal to 3. In systems with an odd number of load pipelines which support load-pair instructions as discussed above, then if one load-pair instruction is being processed using the non-cracked mode or using separate load operations issued in parallel on two of the load pipelines in the same cycle, then there may be at least one load pipeline not being used for that plural-register-load instruction. When there is an odd number of load pipelines then it is not possible to have all of the pipelines processing parallel load operations for load-pair instructions, and there will be a spare pipeline with room only for a single load operation. This will mean that in workloads where virtually all of the load operations being performed are triggered by load-pair instructions, at least one load pipeline may be unused in most processing cycles, which would reduce the effective load bandwidth available for some workloads. This may affect performance. This problem can be addressed by enabling load operations to issue separately for the plural-register-load instruction and using the tracking information to track loss-of-atomicity as discussed above.

The present technique could be used in an in-order processor, where there is a restriction that processing operations should be processed in an order which corresponds to the program order in which the corresponding instructions were defined in memory by a compiler or a programmer.

However, the techniques discussed above can be particularly useful for out-of-order processors where the processing circuitry supports out-of-order processing of instructions in a different order to the program order of the instructions. In an out-of-order processor it is more likely that the individual load operations corresponding to the plural-register-load instruction may end up being separated by a greater number of processing cycles, so that the tracking of loss of atomicity may be more significant. Also, for out-of-order processors there may already be circuitry for tracking disagreement with memory ordering requirements as discussed above, and so it can be efficient to be able to reuse some of the tracking logic and storage structures used for the memory ordering violation detection to also handle detection of loss-of-atomicity.

FIG. 1 schematically illustrates an example of a data processing apparatus 2 which has processing circuitry 4 for performing data processing in response to instructions, a memory system 6 for storing instructions to be processed by the processing circuitry 4 and data for access by the processing circuitry 4, and load tracking circuitry 8 which tracks load operations issued by the processing circuitry 4 in response to load instructions and maintains tracking information 10 providing information about those issued load operations. For example, the tracking information 10 can be used to check whether any memory ordering requirements or atomicity requirements associated with the load operations are satisfied. If a violation of memory ordering requirements or a loss-of-atomicity condition is detected which has the potential to produce incorrect processing results then a flush signal 12 can be sent by the load tracking circuitry 8 to the processing circuitry 4 to request that the processing circuitry 4 is flushed of instructions and restarts execution of instructions from a point of program flow up to which earlier processing was carried out correctly, where the re-executed instructions will include at least those instructions which encounter the violation of the memory ordering requirement or the atomicity requirement. While FIG. 1 illustrates parts of the system for handling load operations, it will be appreciated that the processing circuitry 4 also supports other types of processing operations.

Figure 2:
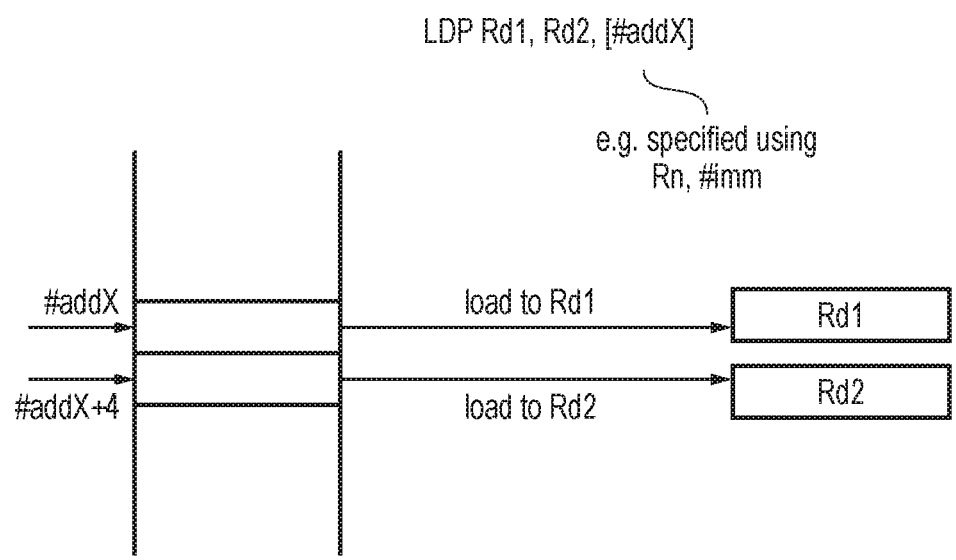
FIG. 2 schematically illustrates an example of a plural-register-load instruction, which in this example is a load-pair instruction.

FIG. 2 illustrates an example of a particular type of load instruction, called a load pair (LDP) instruction. The load pair instruction specifies two destination registers Rd1, Rd2, as well as some address operands for identifying a certain target address #addX. For example #addX could be identified using a source register which stores a base address and an offset value which could be encoded using either a further source register or an immediate value encoded in the instruction encoding of the load pair instruction.

As shown in FIG. 2, in response to the load pair instruction, the processing circuitry 4 issue one or more load operations to the memory system 6 which request that each of the destination registers Rd1, Rd2 is loaded with data from a corresponding target address in memory. In this example the target addresses for the respective destination registers are contiguous within memory, so that the target address #addX identified by the operands of the load pair instruction identifies the block of data to be loaded to the first destination register Rd1, while the target address for the second destination register Rd2 is implicitly encoded as the address #addX+4 which immediately follows after #addX for the first destination register.

It will be appreciated that the offset between adjacent contiguous addresses does not have to be 4—this is just one example. Also, it is not essential that the load pair instruction loads contiguous blocks of data from memory and in other examples further address operands could be provided to separately specify the respective target addresses for each destination register, so as to support non-contiguous loads.

Also, while the subsequent examples describe a load pair instruction, in other examples the instruction may be another type of plural-register-load instruction which loads a variable number of destination registers equal to two or more, for example specifying a list of destination registers and address operands specifying corresponding target addresses of the data to be loaded into each of the specified destination registers. The load pair instruction is a specific example of a plural-register-load instruction.

Figure 3:
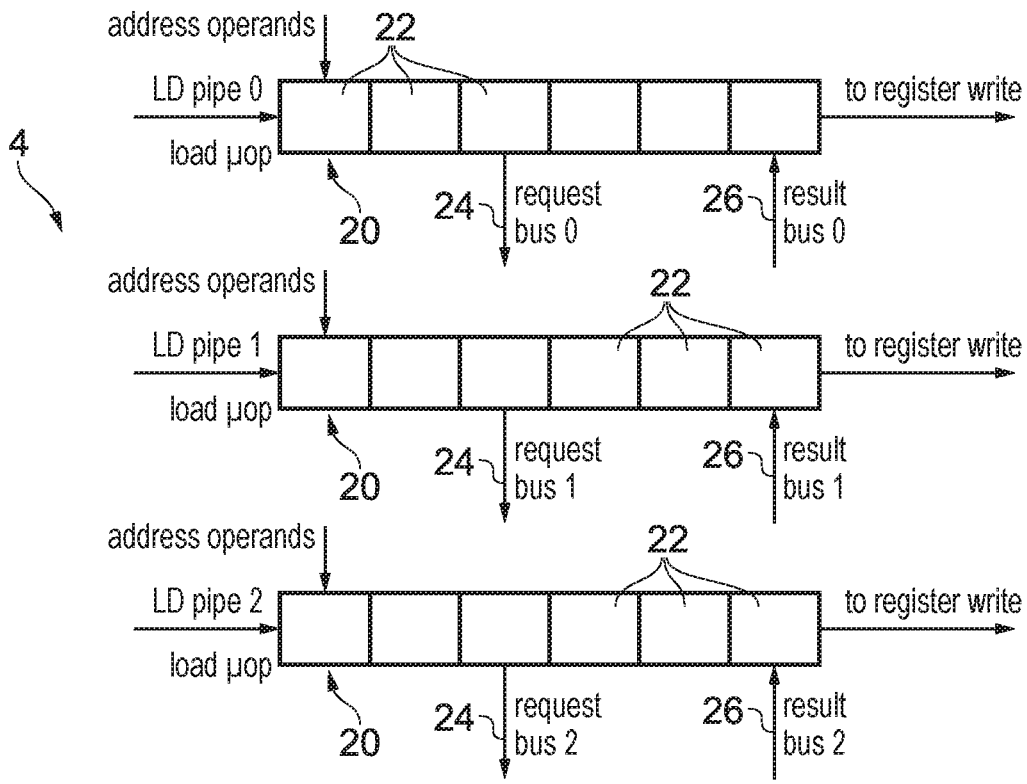
FIG. 3 shows an example of processing circuitry comprising an odd number of load pipelines.

FIG. 3 shows in more detail a portion of the processing circuitry 4 for handling load operations. The processing circuitry 4 may include a number of load pipelines 20 for handling load operations in parallel. In this example the number of load pipelines 20 is 3. Each load pipeline includes a number of pipeline stages 22 for performing different functions in respect of a given load operation to be processed. For example the first pipeline stage of the load pipeline could use the address operands to calculate addresses, while a later pipeline stage may control issuing of a request to the memory system 6 over a request bus 24 and one of the later pipeline stages could receive the data loaded from memory over a result bus 26. It will be appreciated that FIG. 3 shows a simplified representation and it is not essential to have the precise number of load pipeline stages shown in FIG. 3 or for the respective functions regarding address computation, request issuing and result receipt to be performed at the particular pipeline stages shown. Processing of different load operations is pipelined such that while one load is at one pipeline stage having part of the processing being performed on it, another load is at a different pipeline stage having a different part of the load operation processed, so that throughput of load operations is faster than if one load operation had to processed in its entirety before starting the first part of the next load operation.

It will be appreciated that the exact number of load pipelines 20 provided may vary for a given processing implementation, but at least in some systems it is possible that the number of load pipelines may be an odd number as shown in the example of FIG. 3.

Figure 4:
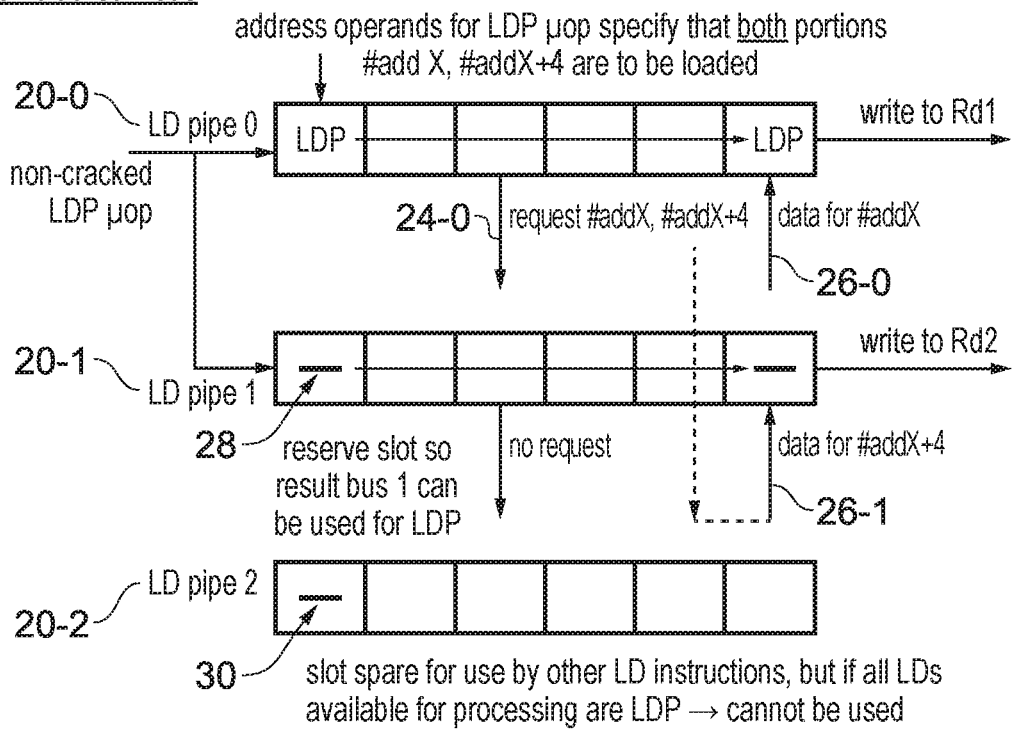
FIG. 4 illustrates an example of processing of the load-pair instruction in a non-cracked mode.

FIG. 4 shows an example of processing the load pair instruction of FIG. 2 using the load pipelines shown in FIG. 3, when the load pair instruction is processed using a non-cracked mode of processing. For the non-cracked mode, the respective load operations for the load pair instruction are handled using a single load request sent to the memory system which requests that the entire block of data associated with both #addX and the subsequent address #addX+4 are to be loaded from memory in response to that single request. For example, in FIG. 4 this combined request is sent over the request bus 24-0 associated with load pipeline 20-0.

However, in parallel with issuing the load pair instruction to load pipeline 20-0, the control circuitry for the load pipelines may also reserve a slot 28 within load pipeline 20-1 which may prevent any other load being processed in that slot. This means that when the load pair instruction reaches the later stages of load pipeline 20-0 and the data for both address #addX and address #addX+4 is returned from memory, the data for #addX can be provided over result bus 26-0 associated with load pipeline 20-0 while the data for the subsequent address #addX+4 can be provided over result bus 26-1 associated with load pipeline 20-1. Hence, by reading all the bytes required for the load pair instruction in response to a single request, but using two different result buses 26-0, 26-1 to broadcast or return the result, this enables the different register writes to the different destination registers Rd1, Rd2 to be controlled by the respective load pipelines 20-0, 20-1, but as the loads are handled in response to a single request to memory this makes it easier to enforce atomicity with little hardware overhead. As the different halves of the same load pair instruction are executed in response to a single load request the atomicity is achieved by default as it is not possible for intervening operations to cause the different parts of the load operation to have a non-atomic view of data in memory.

However, one problem with the non-cracked mode shown in FIG. 4 is that in a system with an odd number of load pipelines 20, the issuing of the load pair instruction requires two different load pipelines 20 to be available in the same processing cycle, and then there is another load pipeline 20-2 which (even if it has a slot 30 which is spare and is not being used for other load instructions) cannot be used to process another load pair instruction because it would only be able to accommodate one half of the load pair instruction and the non-cracked mode requires both halves of the load pair instruction to be performed in the same cycle. In processing workloads where there are enough single load instructions which only specify one destination register, this is not a problem and the spare slot 30 in load pipeline 20-2 can be used for other instructions. However, if all the loads available for processing at this time are load pair instructions then this slot 30 cannot be used and is wasted.

There may be some processing workloads, such as memread or memcpy, for which virtually all the loads are expected to be load pair or other load multiple instructions, in which case the circuit area and the power consumed by load pipeline 20-2 is effectively wasted and the processing of a number of load pair instructions would effectively be serialised so that only one instruction can be processed per cycle, which would harm performance.

Figure 5:
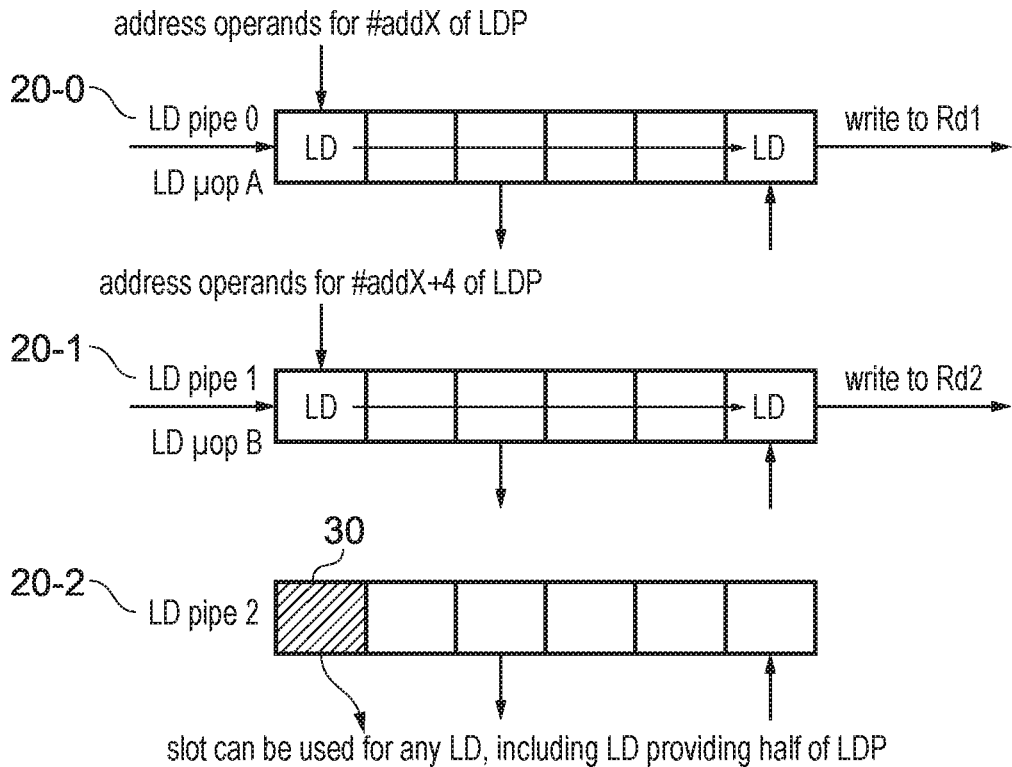
FIG. 5 illustrates an example of processing the load-pair instruction in a cracked mode.

FIG. 5 shows an example of processing the load pair instruction in a cracked mode, where the load pair instruction is split into separate load operations which may be issued separately to the respective pipelines. From the point of view of the load pipelines 20, the load operations issued in response to the load pair instruction appear the same as load operations triggered in response to single load instructions which only have one destination register. Hence, each part of the load pair instruction is specified as a separate micro-operation having a separate set of address operands. The portion of the processing circuitry 4 which cracks the load pair instruction into separate micro operations could be the decode stage which is responsible for decoding instructions, or could be an issue stage responsible for issuing instructions for execution, and that cracking component may be responsible for taking the address operands of the load pair instruction and calculating the address operands for each individual load micro operation (this may require different address operands for each individual load operation issued for the load pair instruction).

In the example as shown in FIG. 5, the different parts of the load pair instruction are issued in parallel in the same cycle to load pipelines 20-0 and 20-1. However, the cracked mode also allows the load operations for a given load pair instruction to be executed across different processing cycles. This means that if there is one load pair instruction being processed using two of the pipelines (e.g. 20-0 and 20-1) then it is possible to use the spare slot 30 within load pipeline 20-2 for any load operation, including a load operation which implements half of the loads needed for a load pair instruction. This avoids the loss of bandwidth described for the non-cracked mode above so can improve performance.

However, if load pair instructions are subject to an atomicity requirement then the splitting of the loads of the load pair instruction across separate cycles may incur a risk that data associated with an earlier processed load changes before a later processed load is processed for the same load pair instruction, so that these loads do not see an atomic view of memory. The load tracking circuitry 8 uses the tracking information 10 to detect whether any loss of atomicity has occurred as a result of issuing the loads for the load pair instruction separately, and then can request re-processing of the load pair instruction if such loss of atomicity is detected.

Figure 6:
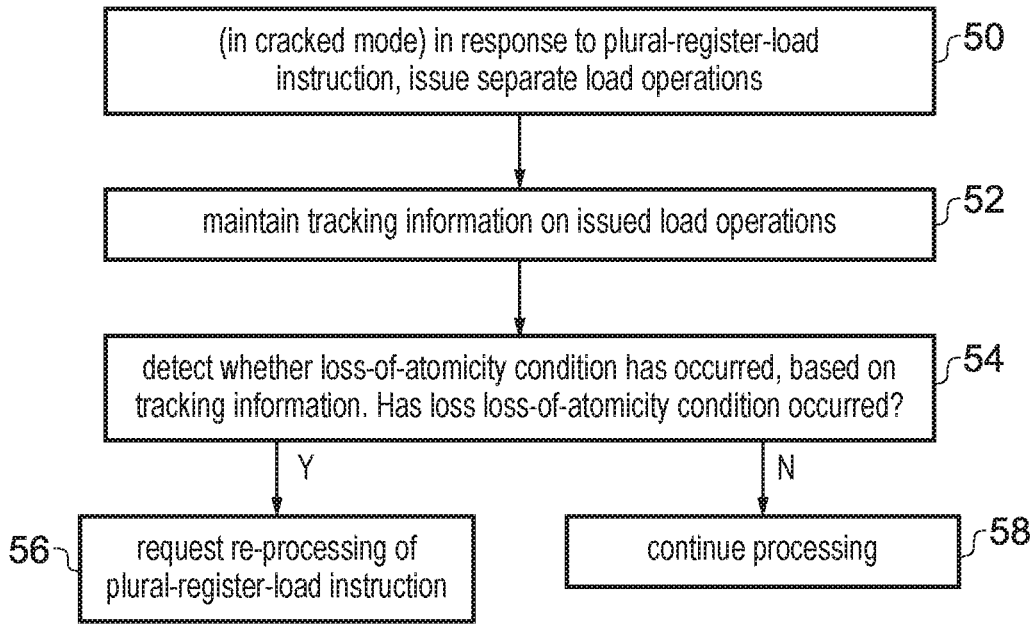
FIG. 6 is a flow diagram showing a method of controlling processing in response to a plural-register-load instruction.

FIG. 6 is a flow diagram illustrating processing of a plural-register-load instruction, which could be the load pair instruction described above, but could also be an instruction which triggers loading of more than two destination registers. FIG. 6 shows processing assuming that the cracked mode shown in FIG. 5 is being used. This could be either because the processing circuitry 4 is part of a system which only supports the cracked mode and does not support the non-cracked mode, or could be because in a system which supports both modes of processing the load pair instruction, the cracked mode is currently selected.

At step 50, as the cracked mode is being used, in response to the plural-register-load instruction, the processing circuitry 4 issues separate load operations to the load processing pipelines 20. These load operations could be issued to different processing pipelines 20 within the same cycle, or could be issued across multiple processing cycles either within the same pipeline or to different processing pipelines, depending on available load bandwidth.

At step 52 the load tracking circuitry 8 maintains tracking information recording properties of issued load operations. At step 54 the load tracking circuitry 8 detects whether a loss-of-atomicity condition has occurred, based on the tracking information maintained for the load operations processed by the load pipelines 20. If the loss-of-atomicity condition has occurred then at step 56 the load tracking circuitry issues the flush signal 12 to request re-processing of the plural-register-load instruction (and if necessary younger instructions than that plural-register-load instruction). If loss-of-atomicity has not occurred then at step 58 processing can continue without needing to repeat the processing of the plural-register-load instruction. Hence, with this approach a better balance between performance and hardware cost can be achieved as the support for the cracked mode can enable better utilisation of load bandwidth while still enabling atomicity to be enforced.

Figure 7:
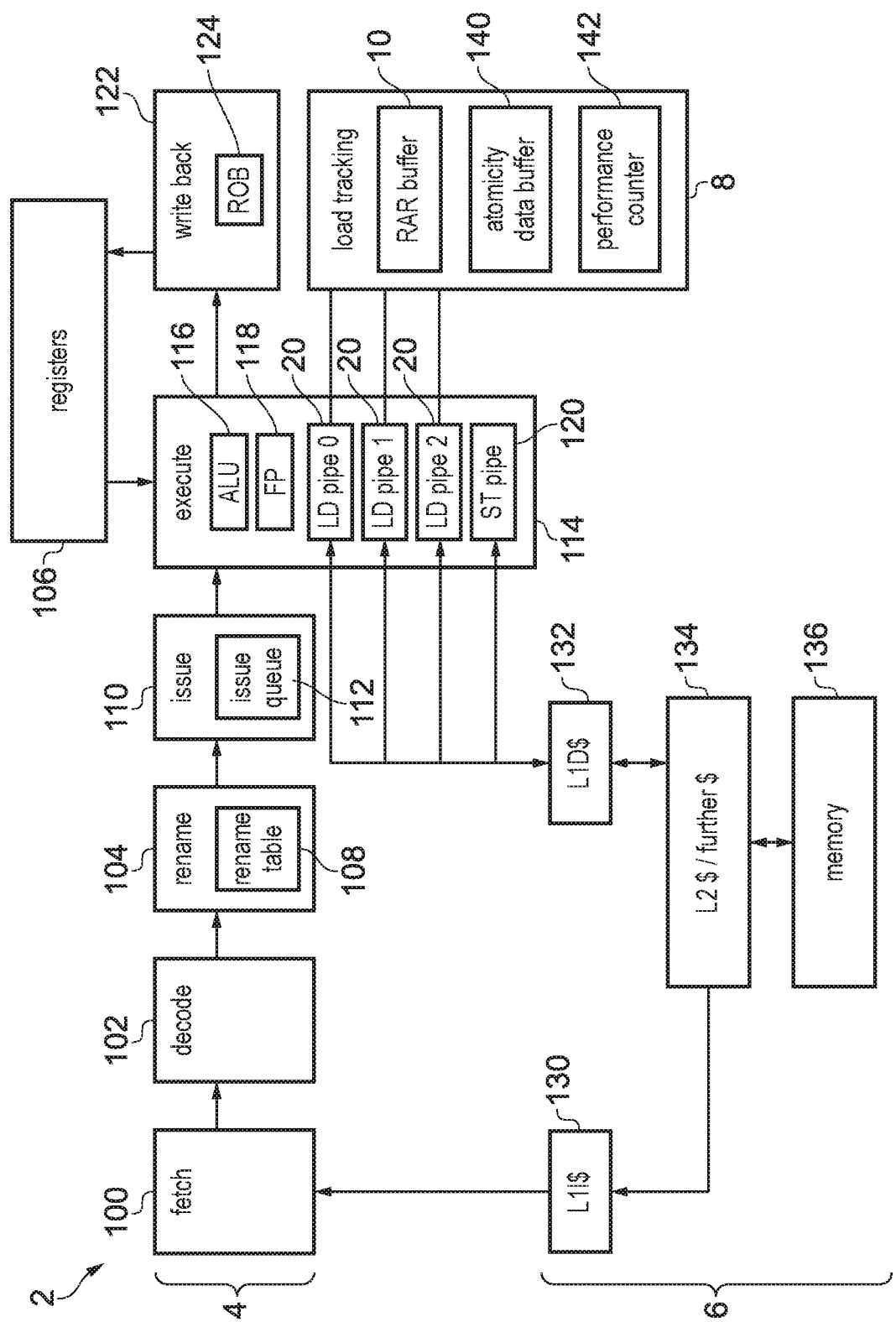
FIG. 7 illustrates a more detailed example of a data processing apparatus having the processing circuitry and the load tracking circuitry

FIG. 7 shows in more detail an example of the data processing system 2 shown in FIG. 2. Again, the system comprises processing circuitry 4, a memory system 6 and the load tracking circuitry 8.

The processing circuitry 4 comprises a processing pipeline with a number of pipeline stages. Instructions progress down the pipeline and at each stage a certain part of the instructions processing is carried out. In this example the pipeline 4 is an out-of-order pipeline which supports instructions being executed in a different order from the program order in which they are stored in the memory system 6.

The pipeline stages in this example include a fetch stage 100 for fetching instructions from the memory system 6, a decode stage 102 for decoding the fetched instructions to identify the operations to be performed and to generate control signals for controlling later pipeline stages to perform the corresponding operations, a register rename stage 104 for mapping architectural register specifiers specified by the instructions to physical registers 106 provided in hardware, using rename mappings tracked using a rename table 108; and an issue stage 110 for retaining issued instructions or micro-operations in an issue queue 112 until their required operands are available and selecting instructions for issuing for execution once the operands are available. As this is an out-of-order pipeline, the issue stage 110 supports the instructions being issued in a different order from the order in which they were fetched by the fetch stage 100, so that if an older instruction (which appears earlier in the program order) is stalled awaiting its operands then a younger instruction (which appears later in the program order) whose operands were already available can be issued ahead of the older instruction.

The pipeline 4 includes an execute stage 114 which includes a number of execution units for executing the processing operations corresponding to the issued instructions or micro-operations. The execute stage 114 includes a number of execution units of different types for executing different classes of instructions, such as an arithmetic/logic unit 116 for executing arithmetic/logical instructions on integer operands, a floating-point execution unit 118 for executing floating-point operations involving operands represented as floating-point numbers, as well as other types of execution unit not shown in FIG. 7 for executing other types of processing operations, such as vector processing, branch operations etc. The execution units may also include a number of load pipelines 20 as discussed earlier, as well as one or more store pipelines 120 for carrying out store operations to store data from the registers 106 to the memory system 6. It will be appreciated that the particular set of execute units shown in FIG. 7 is just one example and other examples may have different types of execution units or may provide different numbers of execution units of any of the types shown in FIG. 7.

At least for some execute units, when the instructions are executed by a given execute unit, the execute unit generates a result which can then be written back to registers 106 by a write back stage 122 of the pipeline. The write back stage may maintain a re-order buffer 124 for tracking commitment of executed instructions based on their execution order and their program order, so that an instruction becomes committed once it has executed and any earlier instructions in the program order have also committed.

It will be appreciated that the processing system 2 could also have many other elements not shown in FIG. 7, such as a branch predictor or memory management unit. In this example the memory system 6 includes a level 1 instruction cache 130, level 1 data cache 132, a shared level 2/further cache 134 and main memory 136, but it will be appreciated that other memory hierarchies could be used, for example with further levels of cache or a different sharing relationship between the instruction caches and the data caches. Also, in a multi-processor-core system, other processing elements with a similar configuration to the one shown in FIG. 7 could share access to the same memory 136, and coherency mechanisms may be used to maintain coherency between the respective caches in the different processing elements, for example using a coherent interconnect or snoop filter providing a snooping mechanism, which generates snoop requests sent to caches 130, 132, 134 associated with one processing element when another processing element issues a request for data. Any known coherency control mechanism may be used for this.

As shown in FIG. 7, the load tracking circuitry 8 may maintain, as a specific example of the tracking information, a read after read (RAR) buffer 10, which will be described in more detail below. Also the load tracking circuitry may have an atomicity data buffer 140 for storing data loaded in response to earlier loads of some plural-register-load instructions, and at least one performance counter 142 for monitoring performance parameters of the processor 4 while processing instructions, which may include for example an indication of the number of times loss-of-atomicity was detected for load-pair or plural-register-load instructions, or an indication of the relative fraction or number of load-pair or other plural-register-load instructions encountered relative to the number of single loads encountered.

Figure 8:
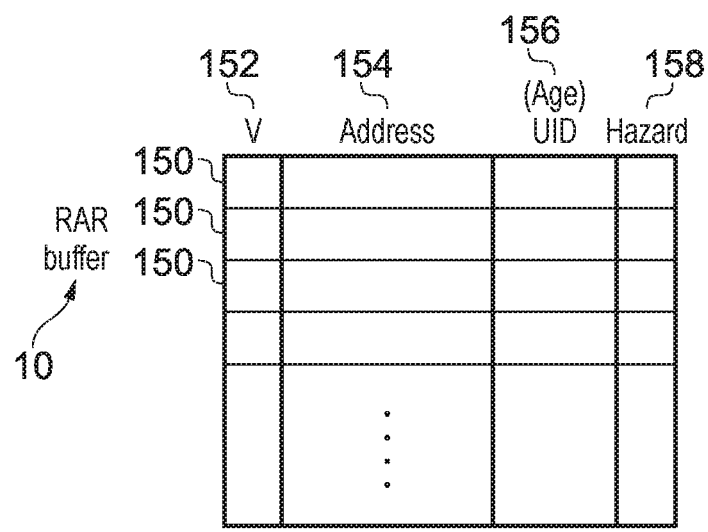
FIG. 8 shows an example of a read after read (RAR) buffer.

FIG. 8 illustrates an example of the RAR buffer 10 in more detail. The RAR buffer 10 may comprise a number of tracking entries 150 which each specify: a valid indication 152 indicating whether the corresponding entry 150 is valid, an address 154 of a corresponding load operation processed by the load pipelines 20, an instruction identifier 156 (UID or unique instruction identifier) which identifies the instruction corresponding to that load operation, and a hazard indication 158 indicating whether a hazard has been detected for the corresponding load operation. As will be described in more detail below the hazard indication could be associated with either a loss-of-atomicity or a violation of a memory ordering requirement. Memory ordering requirements of different types may be enforced on load operations, for example enforcing that an earlier load cannot bypass a later load to the same address, or a requirement that if a barrier instruction is executed then a younger instruction than the barrier cannot be observed to be executed before an instruction which is older than the barrier. The UID 156 may be treated as an indication of the relative age of the instructions corresponding to process load operations. Allocation of the UID to particular instructions could be done by one of the stages of the pipeline 4, such as the fetch stage 100 or decode stage 102, within the portion of the pipeline where instructions are still being processed in program order for example. For example each time a new instruction is fetched the fetch stage 100 could allocate the next UID value 156 to that instruction. The UIDs may be an indication of relative age of the instructions in program order, e.g. being allocated in age order.

The RAR buffer 10 may be searchable either by address 154 or by UID 156, so that when a given load operation is processed, the load tracking circuitry 8 can detect whether there is a valid entry in the RAR buffer for the same address 154 and/or whether the RAR buffer 10 already includes a valid entry for the same UID 156. The address field 154 could specify either: a full physical address (PA), a portion of the full PA which identifies a cache line, or a hash value derived from the full PA or portion of the PA using a hash function which may map the PA (or cache line identifying portion of the PA) to a hash value having fewer bits than the PA, so that multiple PAs may alias onto the same hash value, leading to a potential for false positive detections of address hazarding. Hence, for the purpose of comparing an address stored in the RAR buffer 10 and an address of a load operation or snoop, the addresses may be considered to be "corresponding" in any of the following cases: the addresses are the same; cache line portions of the addresses are the same; or the addresses are different but are aliasing addresses which are both mapped to the same hash value by the hash function.

Figure 9:
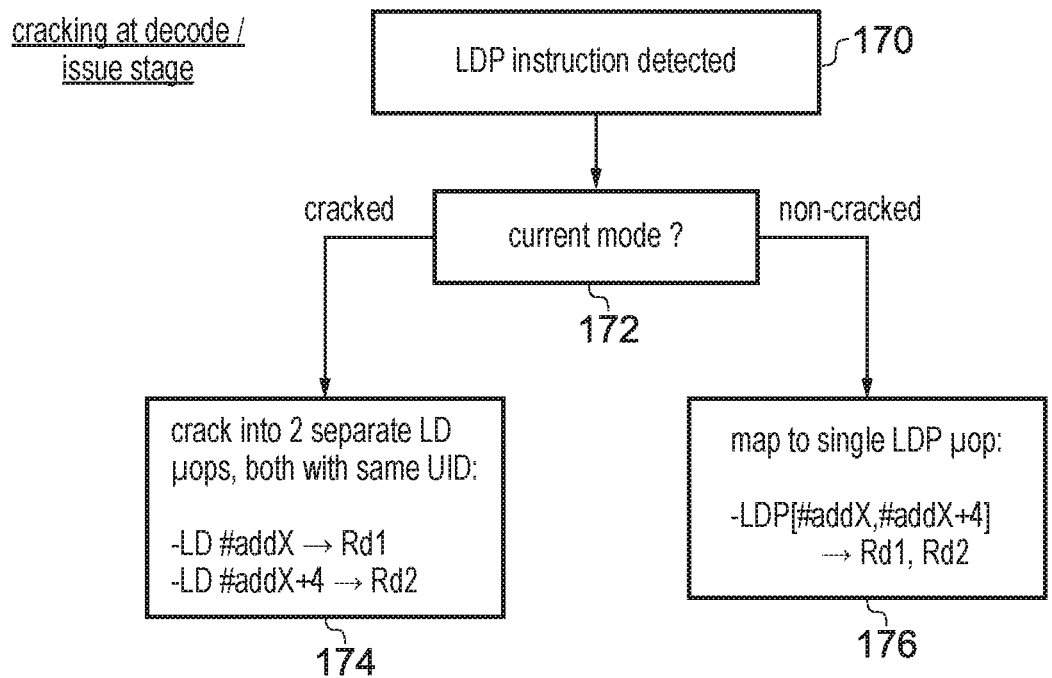
FIG. 9 is a flow diagram illustrating cracking of a plural-register-load instruction at a decode or issue stage of the pipeline.

FIG. 9 is a flow diagram illustrating cracking of a load pair instruction. This method could be performed for example at the decode stage 102 or at the issue stage 110 of the processing pipeline 4. At step 170 the relevant stage of the processing pipeline 4 detects whether the current instruction to be processed is a load-pair instruction, and if so then at step 172 it is detected whether the current mode is the cracked mode or the non-cracked mode. If the current mode is the cracked mode, then at step 174 the processing pipeline 4 cracks (splits) the load-pair instruction into two separate load micro-operations both having the same UID 156 associated with them. One load micro-operation specifies the same target address #addX as the address identified by the operands of the load pair instruction and specifies as its destination register the first target register Rd1 identified by the load pair instruction. The other load micro-operation specifies as its target address the next address extending sequentially after the address of the other load micro-operation, e.g. #addX+4 if the size of the block of data corresponding to the first load operation corresponds to an address offset of 4, and specifies as the destination register the second destination register Rd2 of the instruction.

On the other hand, if the current load is the non-cracked mode then at step 176 the load pair instruction is mapped to a single load pair micro-operation which explicitly or implicitly specifies the data block corresponding to both addresses #addX, #addX+4 and which specifies both destination registers Rd1, Rd2. This will then instruct the load pipelines that they are to be processed as shown in FIG. 4 with result buses 26 on two load pipelines being reserved for returning data loaded in response to a single combined load request.

In systems which do not support the non-cracked mode then steps 172 and 176 can be omitted and the method may proceed direct from step 170 to step 174. It will be appreciated that at step 174, if the instruction is a plural-register-load instruction which specifies more than 2 destination registers then more than 2 load micro-operations may need to be generated.

Figure 10:
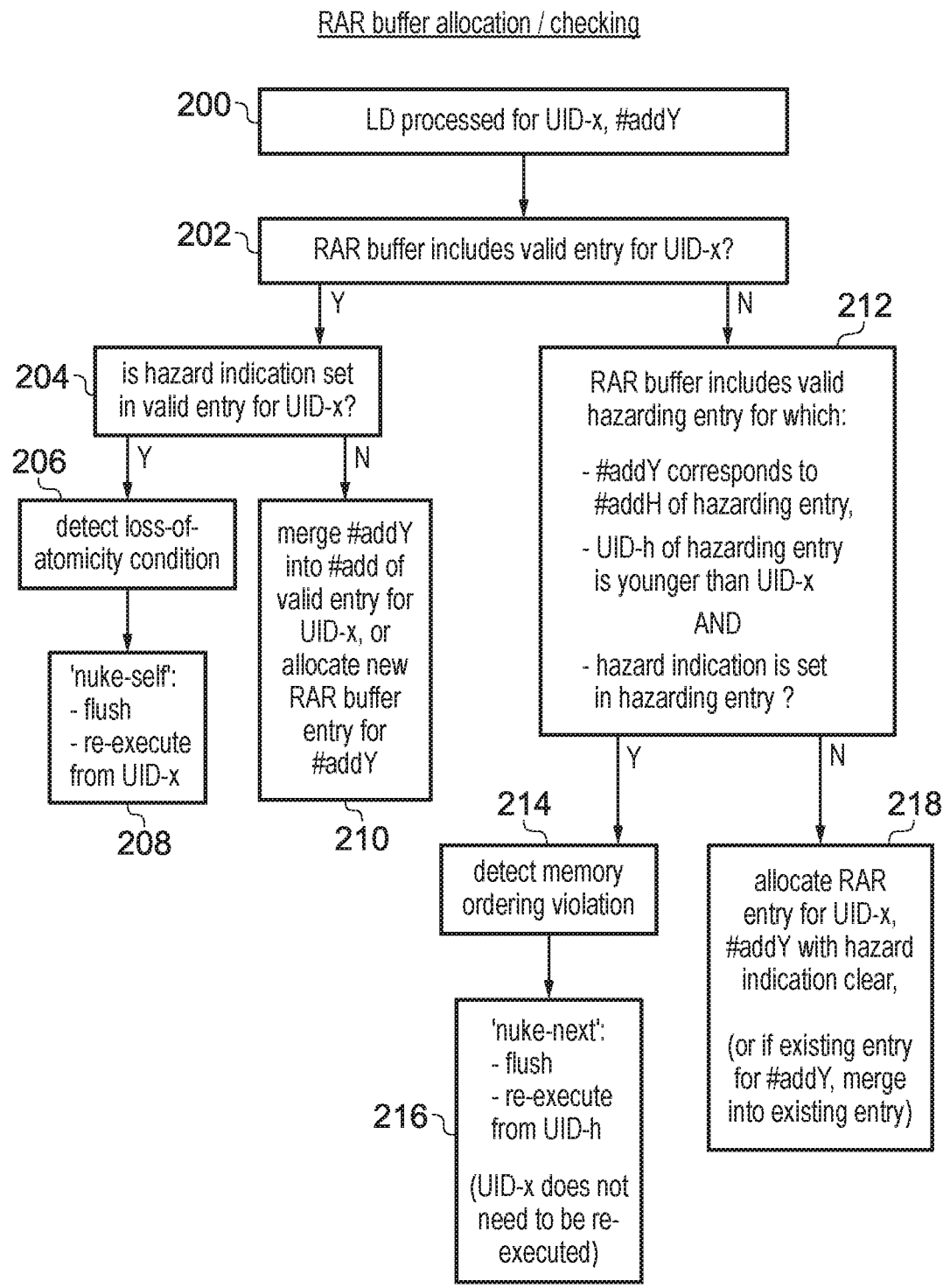
FIG. 10 is a flow diagram showing maintenance of tracking information in the RAR buffer and checking for whether a memory ordering violation or a loss-of-atomicity condition has occurred.

FIG. 10 is a flow diagram showing use of the RAR buffer for tracking load operations and checking for hazards caused by memory ordering violations or loss-of-atomicity. At step 200 the load tracking circuitry 8 detects that a load operation is processed which specifies a given UID (UID-x) and a certain target address #addY. This load could be a load triggered by a single load instruction which only has one destination register, or could be one of the loads issued for a load pair instruction processed in the cracked mode. Alternatively the load could be a single combined load pair micro-operation issued for a load pair instruction in the non-cracked mode.

At step 202 the load tracking circuitry 8 determines whether the RAR buffer 10 already includes a valid entry 150 specifying UID-x within its UID field 156. If the load was triggered by a single load instruction or by a load pair instruction processed in the non-cracked mode then there should not be any valid entry for UID-x.

If the RAR buffer includes a valid entry for UID-x, then this indicates that the current processed load is one of the later processed loads of a load pair instruction processed in the cracked mode. At step 204 the load tracking circuitry 8 determines whether the hazard indication 158 is set in the valid entry for UID-x. If the hazard indication is set, then this indicates that there was a potential change to the data associated with the earlier processed load operation which caused that valid entry for UID-x to be allocated to the RAR buffer 10, before the latest processed load was encountered, which could result in loss-of-atomicity for the load pair instruction. Hence, at step 206 if the hazard indication is set in the valid entry for UID-x then the loss-of-atomicity condition is detected and at step 208 the load tracking circuitry 8 requests that the load pair instruction is re-processed, for example by issuing the flush signal 12 to flush the processing pipeline 4 of instructions of the same age or younger than the load pair instruction and then to trigger re-execution of any instructions from the instruction identified by the instruction identifier UID-x. As at step 208 the instructions requested to be re-executed include the instruction identified by the instruction identifier UID-x of the current load being processed at step 200, this operation is referred to as a "nuke-self" operation in shorthand.

On the other hand, if at steps 202, 204 it is detected that the RAR buffer includes the valid entry for UID-x but the hazard indication in that entry is not set, then no loss-of-atomicity is detected and so it is not necessary to trigger the nuke-self operation. At step 210 address information for address #addY may be merged into any existing address information 154 stored in the valid entry for UID-x within the RAR buffer 10, e.g. if the addresses of the entry for UID-x and #addY refer to different bytes within a cache line. Alternatively, if the address #addY extends to a different cache of data to the one indicated by the address 154 in the existing entry, then a new RAR buffer entry 150 can be allocated for the pair (UID-x, #addY).

If at step 202 it was determined that the RAR buffer did not include a valid entry specifying UID-x of the latest load, then at step 212 the load tracking circuitry 8 checks for hazarding entries which may signal a possible memory ordering violation. In particular the load tracking circuitry 8 detects whether the RAR buffer 10 includes a valid hazarding entry for which all of the following requirements are satisfied;

The address #addY corresponds to an address #addH in the address field 154 of the hazarding entry (note that the addresses #addY and #addH need not correspond exactly, but may be considered to correspond if any part of the block of data required for the load to address #addY overlaps with any part of the block of data indicated by address #addH, or if the addresses #addY, #addH share the same hash value in implementations which use a hash function to compress the address stored in the RAR buffer);

The UID field 156 of the hazarding entry specifies an instruction identifier UID-h which indicates a younger instruction than the instruction identified by UID-x as specified for the current load encountered at step 200; and The hazard field 158 for the hazarding entry has been set to indicate that a hazard was detected.

If a hazarding entry is identified in the RAR buffer 10, for which all of these three requirements are satisfied, then at step 214 a memory ordering violation is detected as this may be an indication that instructions or load operations were processed in an order which is inconsistent with an order imposed by an architectural memory ordering requirement and the presence of the hazard indication indicates that this has a potential to cause incorrect processing results. Hence at step 216 the load tracking circuitry issues the flush signal 12 to the processing circuitry 4 to request flushing of the instructions form the pipeline and re-execution of instructions starting from the instruction identified by the UID-h of the instruction identified by the hazarding entry 150. Note that in this case the instruction identified by the UID-x of the current load does not need to be flushed and re-executed. This operation at step 216 may be referred to as a "nuke-next" operation, which contrasts with the nuke-self operation at step 208 where the instruction associated with UID-x is itself re-executed.

On the other hand, if at step 212 the load tracking circuitry 8 detects that there are no hazarding entries in the RAR buffer 10 (so that for each entry 150, either the entry is invalid or at least one of the criteria shown at step 212 is not satisfied), then there is no memory ordering violation detected and so there is no need to trigger a flush and re-execution. Instead, at step 218 a new RAR buffer entry 150 can be allocated for the load associated with UID-x and address #addY. The new entry is allocated specifying the valid indication indicating a valid entry, the address and UID field set based on #addY and UID-x respectively, and the hazard field 158 set to clear to indicate that no hazard has yet been detected for this entry. Alternatively, if there is already an existing entry for address #addY it is possible to merge the new request into the existing entry (e.g. by updating the UID field to specify the youngest of the instructions whose entries are being merged).

Note that in the case where at step 212 it is detected that there is a valid entry of the RAR buffer whose address field 154 specifies an address #addH which corresponds to the address #addY of the latest load and for which the UID field 156 specifies a younger UID, UID-h than UID-x of the current load, then this indicates that these loads have been processed in violation of the memory ordering requirement which requires that loads the same address should be processed in program order. However, this violation of the memory ordering requirement is only a problem if there has been a hazard detected for these loads indicating that the data could have changed in between processing the earlier processed load and the later processed load. If no hazard indication is set then this will indicate that the result of processing the loads out of order was the same as if they had been processed in the correct order, so that there is no need to trigger the flush and re-execution for dealing with the memory ordering violation. Hence, the RAR buffer 10 is not merely being used to detect any disagreement with memory ordering requirements enforced on certain load instructions, but is also being used to detect whether the results of those instructions are incorrect or are correct despite the disagreement with the memory ordering requirement. The memory ordering violation is detected in the case where the disagreement with the memory ordering requirements causes potential for incorrect results, but not when there is no risk of incorrect results, so as to reduce the frequency with which the nuke-next operation at step 216 is needed and hence maintain performance. As compared with the alternative approach of only issuing load operations in an order which corresponds to the required order enforced by the memory ordering requirement, this can enable improved performance because there are more opportunities for re-ordering program instruction execution according to operand availability which can improve throughput of instructions.

The requirement to execute loads to the same address in program order may not be the only example of a memory ordering requirement. Another example can be that a barrier instruction may be defined which when executed may indicate that execution results should be consistent with the results which would be achieved if none of the loads triggered by instructions younger than the barrier instruction are performed ahead of load operations triggered by instructions which are older than the barrier instruction. This does not necessarily mean that it is prohibited for any younger instructions to have its loads executed before an older load preceding the barrier instruction, but the processing circuitry should at least have a mechanism for detecting the case where an instruction younger than the barrier is executed ahead of an instruction older than the barrier where other data accesses could have changed the data involved in those instructions in the meantime so that the results might be inconsistent with the results which would have been achieved if the correct ordering had been observed. The RAR buffer 10 can also be used to detect such violations of such memory barrier ordering requirements.

Figure 11:
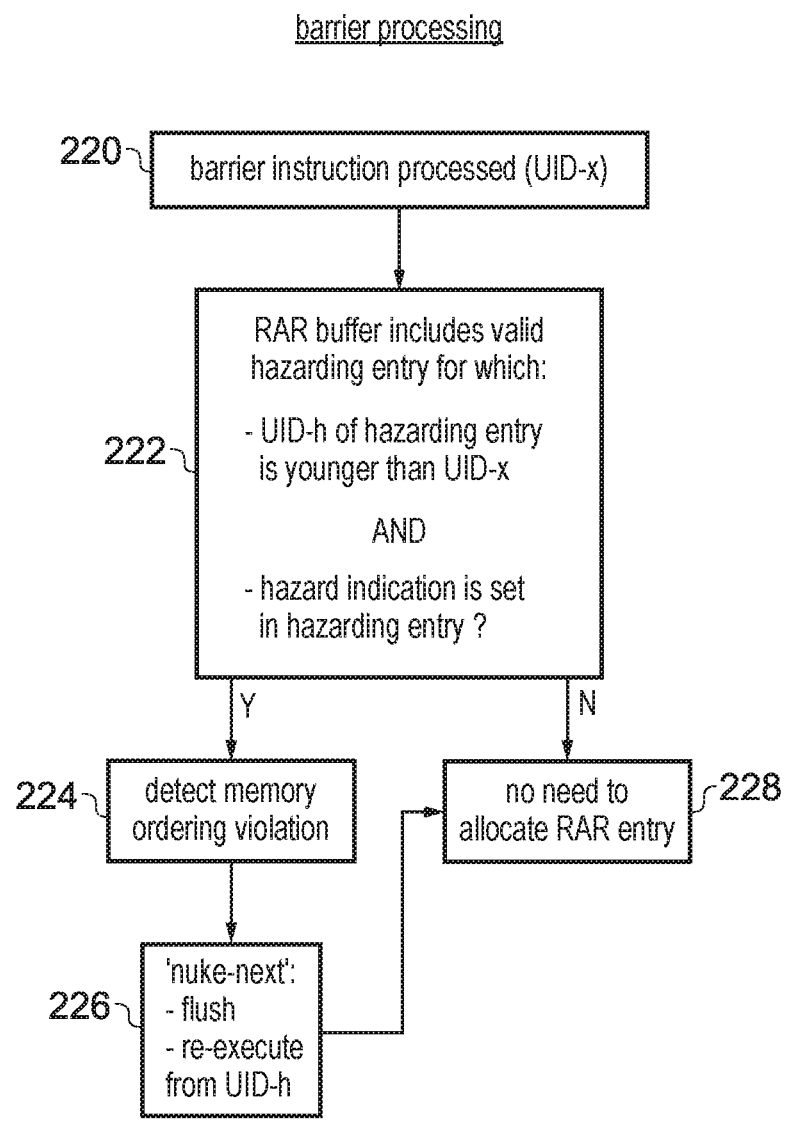
FIG. 11 is a flow diagram showing processing of a barrier instruction.

FIG. 11 shows an example of processing a barrier instruction. At step 220 the barrier instruction is processed. The barrier instruction is associated with a certain instruction identifier, UID-x. At step 222 the load tracking circuitry 8 detects whether the RAR buffer 10 includes a valid hazarding entry for which the UID field 156 indicates a younger UID-h than UID-x associated with the barrier instruction, and for which the hazard indication field 158 is set to indicate that the hazard has been detected. Note that (in comparison to step 212 of FIG. 10) for step 222 there is no requirement for the address field 154 of the hazarding entry to correspond with any address associated with the barrier instruction 220. If the UID-h of the hazarding entry is younger than the UID of the barrier and the hazard indication is set then this is an indication that there is a potential that the younger instruction identified by UID-h could have been executed ahead of a load which preceded the barrier, and the setting of the hazard indication indicates that this has the potential to create incorrect results which are inconsistent with the results which would be achieved if the instructions had been processed in the order enforced by the barrier. Hence, at this point at step 224 a memory ordering violation is detected and at step 226 a nuke-next operation is performed the same as at step 216 of FIG. 10. On the other hand, if at step 222 there was no hazarding entry detected (so for each entry of the RAR buffer 10, the entry is either invalid, specifies an older UID than UID-x or has the hazard indication 158 clear) then no memory ordering violation is detected and so at step 228 there is no need to trigger the nuke-next operation. Regardless of whether the memory ordering violation was detected or not, for a barrier instruction there is no need to allocate an RAR buffer entry 150 for the barrier instruction (step 228 is reached after step 226 as well as on the 'N' branch of step 222).

Figure 12:
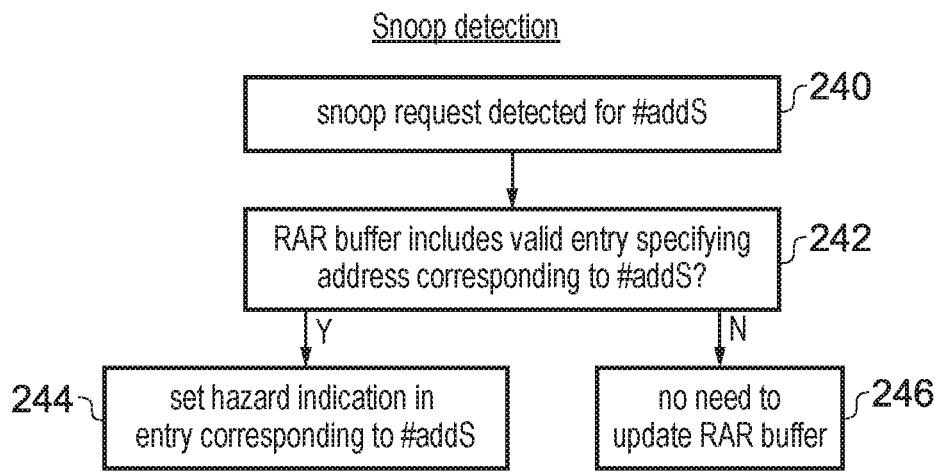
FIG. 12 is a flow diagram showing updating of the RAR buffer in response to detection of a snoop request.

FIG. 12 is a flow diagram showing use of the RAR buffer 10 when snoop requests are detected for a given snoop address #addS. This snoop may be issued to one or more of the caches 130, 132, 134, for example based on a coherency scheme for maintaining coherency between these caches and caches in other processing elements of the same processing system. At step 240 the snoop request is detected. In response to the snoop request, at step 242 the load tracking circuitry 8 detects whether the RAR buffer includes a valid entry 150 which specifies an address corresponding to the snooped address #addS. If so, then at step 244 the hazard indication field 158 in the valid entry corresponding to #addS is set. If there is no valid entry in the RAR buffer 10 corresponding to #addS then at step 246 there is no need to update the RAR buffer 10 in response to the snoop request 240. Note that in some cases the steps performed in FIG. 12 may be performed only in response to certain types of snoop request and there may be other types of snoop request which do not require updating of the RAR buffer at all.

Figure 13:
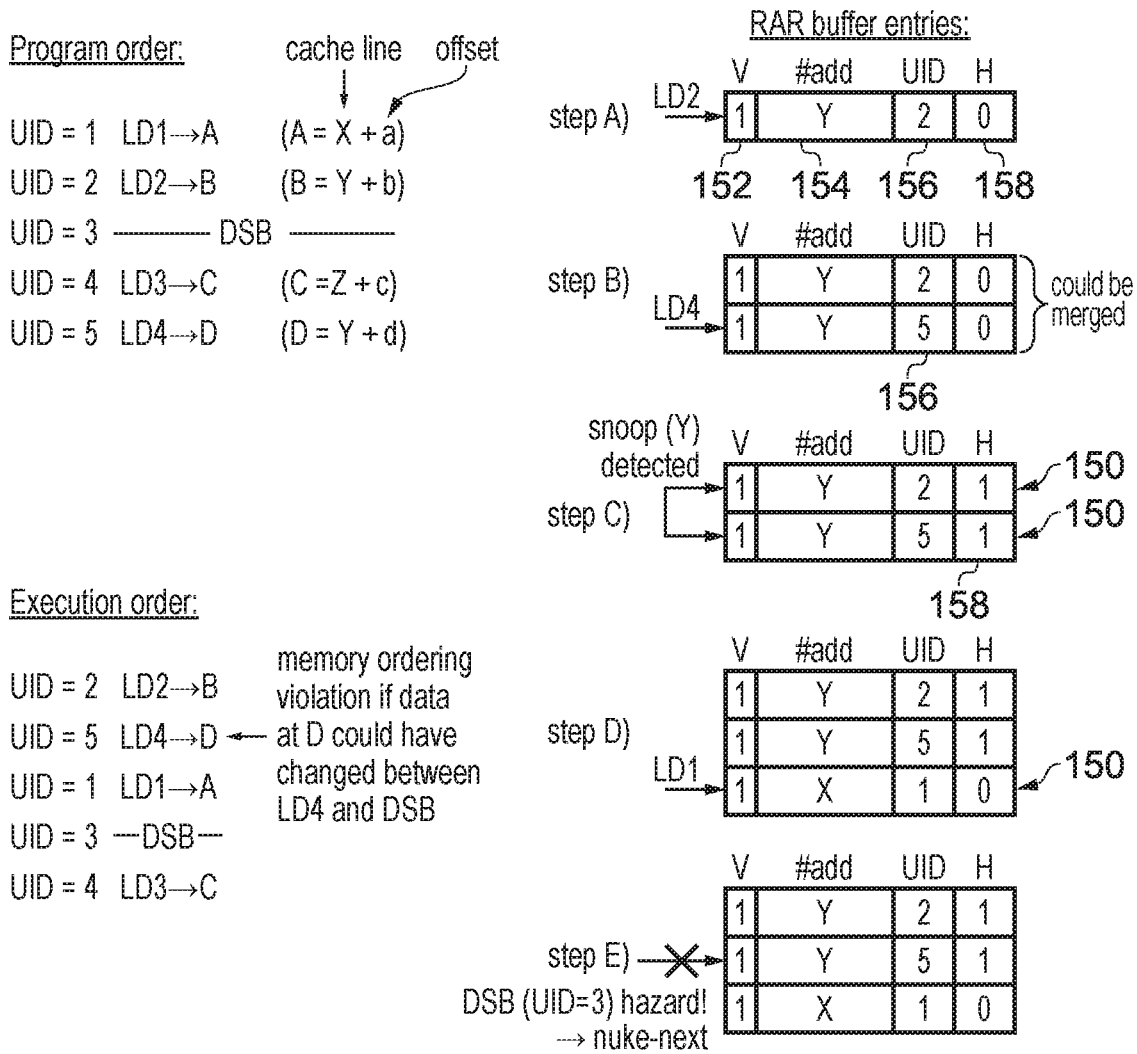
FIG. 13 shows a worked example illustrating use of the RAR buffer for detecting memory ordering violations.

FIG. 13 shows a worked example illustrating detection of a memory ordering violation using the RAR buffer 10 (in this example, the memory ordering requirement is caused by a barrier instructions). The top left part of FIG. 13 shows several load operations to be processed, arranged in program order, relative to a barrier instruction DSB. Each instruction is assigned a UID, and the UIDs are assigned in an order corresponding to the program order. Although FIG. 13 shows consecutive UIDs 1-5 for the respective instructions, it will be appreciated that in practice these loads may be separated by other types of non-load or barrier instruction and so it is possible that the UIDs for the respective instructions may not be consecutive.

Accesses to memory may be controlled within the memory system 6 in units of data having a certain size referred to as a cache line, so that even if a given load operation only requires a certain part of the data from that cache line, the memory system may nevertheless return the entire cache line. This can help with improving performance as it is quite common that if a load requests one part of the cache line, a subsequent load may request another part of the same cache line. Typically, caching within the caches 130, 132,134 and/or coherency management based on the snoop requests may be tracked using addresses at the granularity of an individual cache line. Hence, for consistency with this tracking, the addresses 154 in the RAR buffer may also indicate an address of an entire cache line and may not distinguish between which particular byte portion is accessed by an individual load operation within a cache line. As shown in the top left part of FIG. 13 the addresses A-D of the respective loads could be formed using a first portion X, Y or Z which identifies the cache line to be accessed and a second portion a-d which indicates an offset within the cache line. In this example the addresses B and D are such that they are accessing different offsets within the same cache line and so they share the same cache line portion Y but have different offsets b, d. Hence, as the address tracking 154 in the RAR buffer 10 is at the granularity of cache lines these loads would be seen as accessing the same address even though they are actually accessing different offsets within the same cache line.

As shown in the bottom left part of FIG. 13, due to out of order processing by the processing pipeline 4, the execution order in which the load operations are actually carried out may be different from the program order. For example, if the load LD1 is stalled because its address operands are not ready yet, then other load operations LD2, LD4 may be performed ahead of it.

The barrier instruction DSB signals that there is an architectural requirement for the results of processing to be consistent with the results that would be achieved if none of the loads LD3, LD4 which follow the barrier instruction DSB are executed ahead of any of the older loads LD1, LD2 which precede the barrier instruction in the program order. Hence, while the ordering requirement imposed by the barrier instruction may be respected if LD2 is reordered ahead of LD1, because these are all instructions on the same side of the barrier, or if LD4 is reordered ahead of LD3, it is a disagreement with the ordering requirement for LD3 or LD4 to be performed ahead of either LD1 or LD2. Hence, in the example of the execution order shown at the bottom left of FIG. 13 there is a memory ordering disagreement because load LD4 has been executed before load LD1.

This disagreement between the execution order and the memory ordering requirements imposed by the barrier instruction can be tolerated, provided that there is no possibility that data associated with address D of load LD4 changed between the actual execution of load operation LD4 and the execution of the barrier instruction DSB. However, if the data associated with address D could have changed then it is possible that the disagreement with the memory ordering requirement could have caused the wrong results and in the case it would be needed to re-execute load operation LD4.

The right hand part of FIG. 13 illustrates updating of the RAR buffer 10 in response to the operations shown in execution order at the bottom left of FIG. 13. At step A, load operation LD2 is executed to address B and so the cache line portion Y of the address (or a hash of this portion) is allocated into a new RAR buffer entry 150 specifying the UID=2 for load operation LD2 and the hazard flag 158 is clear when that entry is initially allocated. In FIG. 13, for conciseness only valid entries 150 of the RAR buffer relating to the particular instructions shown in the examples on the left-hand side of FIG. 13 are shown and any other RAR buffer entries are omitted.

At step B, the load operation LD4 is executed to address D within cache line Y and so a RAR buffer entry which is valid and corresponds to the address Y and UID 5 is allocated into the RAR buffer. As mentioned above it is possible for entries to be merged if desired as the entries for LD2 and LD4 both relate to the same cache line address Y. If the entries are merged then the UID field 156 of the merged entry would take the UID of the younger of the loads associated with the merged entries. However, in the particular example shown in FIG. 13 these entries are not merged.

At step C in the example of FIG. 13 a snoop request specifying the cache line address Y is detected and so the hazard fields 158 of any entries corresponding to address Y are set. This is not in itself a problem because if no disagreement with the memory ordering requirement occurs, then the presence of the hazard would not have affected the correctness of the results. Hence, processing continues despite the hazard having been detected and marked within the RAR buffer entries associated with address Y.

At step D the load operation LD1 is executed and as this does not correspond to the UID or the address of any existing entry, a new RAR buffer entry 150 is allocated for address X and UID1 associated with load LD1, and the hazard flag is set to 0 in that entry. Although LD1 has an older UID than the existing entries for LD2 and LD4 with the hazard flag set, this is still not in itself a problem because LD1 relates to a different address to the address Y of existing entries and so this does not violate the requirement to execute loads to the same address in program order, and if there is no subsequent barrier instruction then there is no restriction on reordering load LD2 or LD4 ahead of load LD1.

However, at step E of FIG. 13 the barrier instruction DSB is encountered and the DSB introduction has a UID of 3. On looking up the RAR buffer, the load tracking circuitry 8 detects that there is at least one existing entry which has a younger UID (5) than the UID (3) of the DSB instruction and which has the hazard flag set, and therefore the nuke-next operation is triggered which will cause any instructions with younger UIDs than the DSB instruction to be flushed from the pipeline, and will cause program execution to restart from the UID 4 of the next instruction after the DSB instruction, which will therefore cause the load operation LD4 (which was executed early in violation with the ordering requirement) to be re-executed so that it will then see the updated results of any updates to address Y which caused the issuing of the snoop request detected at step C. Once load LD4 has been re-executed the processing will then have generated results consistent with those required by the ordering requirement.

At steps A, B and D of FIG. 13, when a new entry of the RAR buffer is allocated then any invalid entry may be selected for use of the new entry. Entries may be invalidated from the RAR buffer when the write back stage 122 confirms that the corresponding UID has been committed. If a given load is to be processed and there are no invalid RAR buffer entries 150 spare then processing of load operations may be stalled until a spare entry can be recovered.

Barriers are not the only memory ordering requirement—it will be appreciated that the RAR used as shown in FIG. 10 also enables detection of memory ordering violations involving loads to the same address executed out of program order.

Figure 14:
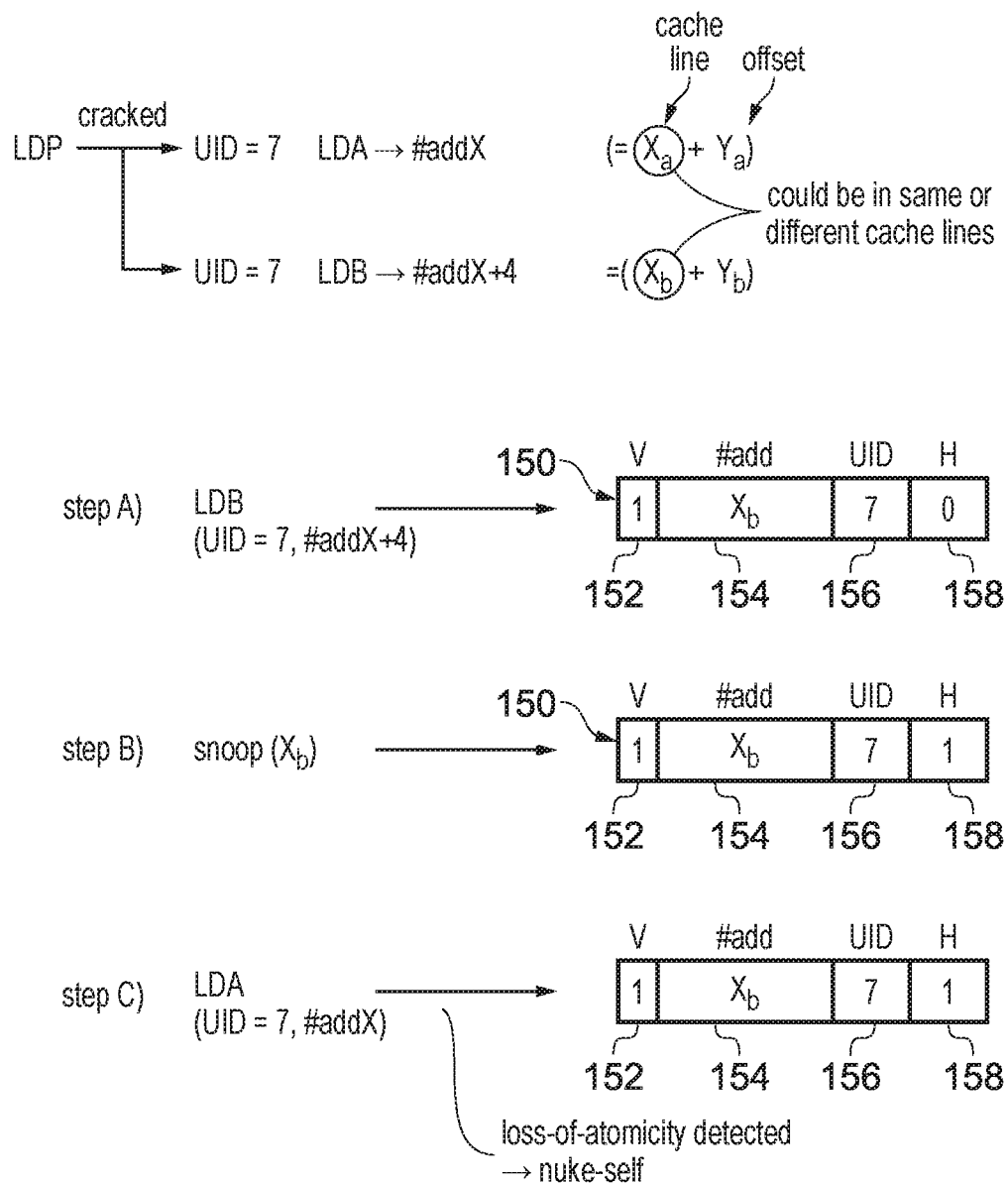
FIG. 14 is a worked example showing use of the RAR buffer for detecting a loss-of-atomicity condition for a load-pair instruction.

FIG. 14 shows another worked example of using the RAR buffer to detect loss of atomicity associated with load pair instructions in the case where they are cracked into separate load operation. Hence, in this example the load pair instruction is cracked into two separate load operations, LDA and LDB, which are both assigned the same UID value, 7 in this example. Again, the addresses #addX and #addX+4 of the respective load operations LDA, LDB can be considered to include a cache line portion $X_a$ or $X_b$ and an offset portion $Y_a$ or $Y_b$. $X_a$ and $X_b$ for the two load operations could refer to either the same cache line or to different cache lines, depending on the address operands of the load pair instruction.

For ease of explanation in the example of FIG. 14 the RAR buffer allocations for any instructions other than the load pair instruction are not shown. It will be appreciated that memory ordering requirements could be detected with respect to the loads of the load pair instruction the same as shown in FIG. 13. At step A of FIG. 14 one of the individual load operations for the load pair instruction is processed, in this example the second operation LDB being processed first, although in other examples LDA could have been processed first. Whichever of the halves of the load pair instruction is processed first, that load operation triggers allocation of an RAR buffer entry 150 which has the valid field 152 specifying a valid entry, the address field 154 specifying the cache line portion $X_b$ of the address of that load, the UID field 156 specifying the UID (=7) for the load pair instruction and the hazard field 158 clear.

If at step B of FIG. 14 a snoop request is detected for the cache line address $X_b$, then the hazard flag 158 is set if there is a valid RAR buffer entry 150 present for address $X_b$.

Subsequently at step C the other load operation LDA of the load pair instruction is processed and at this point the load tracking circuitry 8 looks up the RAR buffer and detects that it contains a valid entry for the same UID=7 as the latest processed load LDA and for which the hazard flag 158 is set, and therefore a loss of atomicity condition is detected and the load tracking circuitry 8 triggers the nuke-self operation to flush any instructions associated with UID 7 or younger from the pipeline and then trigger re-execution of instructions starting from UID=7. This prevents processing continuing based on a data value for cache line $X_a$ which has a value potentially after an update in memory while the data value written to destination register for LDB could be a value which was read prior to an update in memory affecting that cache line. By ensuring that a load pair instruction is re-executed if a potential change to data between processing of an earlier processed load and a later processed load for the same load pair instruction is detected, this ensures that the atomicity requirement is respected.

Hence, these examples show how the same RAR buffer structure can be used for tracking both memory ordering requirements and atomicity requirements, and by using it for enforcing atomicity this means that the cracked mode becomes feasible and so can be used to extract greater bandwidth utilisation from the available load pipeline bandwidth.

Figure 15:
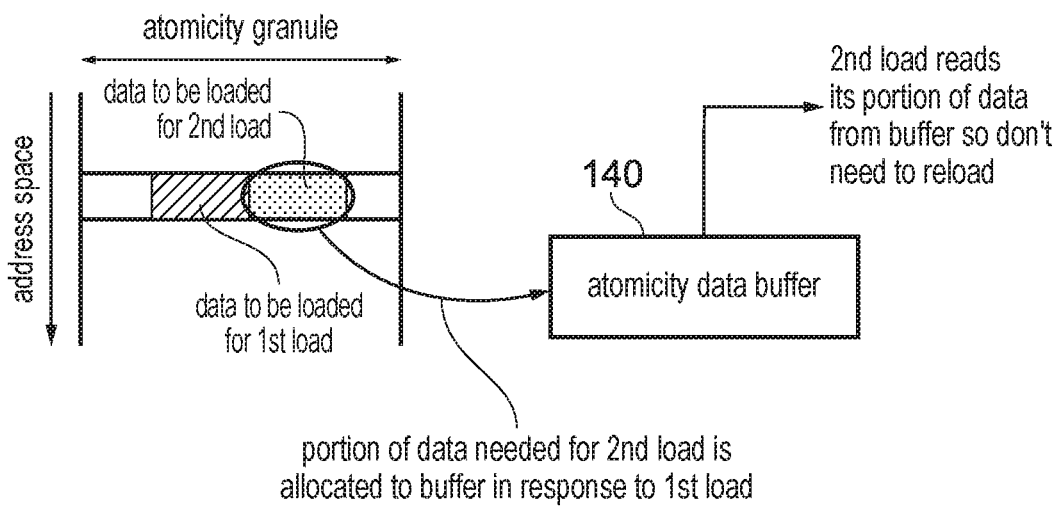
FIG. 15 illustrates use of an atomicity data buffer.

FIG. 15 shows processing of the loads of a load pair instruction or other plural-register-load instruction in an atomicity-buffering mode, which is not essential but can be useful for providing a stronger guarantee of forward progress. The atomicity-buffering mode may be an alternative to the cracked mode and non-cracked mode described above, which may be used for selected plural-register-load instructions. As mentioned above, the processing circuitry may have an atomicity data buffer 140. The atomicity data buffer 140 may be used for buffering of data loaded in response to one load which may not be needed for that particular load but can be reused for a later load.

The atomicity requirement may require atomicity to be enforced at the level of a certain block size called an atomicity granule, such that if a plural-register-load instruction is subject to the atomicity requirement, then the different loads associated with that instruction may need to be processed atomically if the respective portions of data requested by those loads are within the same atomicity granule, but it may not be necessary to ensure atomicity if the loads target data in different atomicity granules. The atomicity granule could be a cache line or could be another size of block of data. In some cases the size of the atomicity granule may be variable based on a control parameter.

Hence, when a plural-register-load instruction is processed in the atomicity-buffering mode, when the instruction requires two or more load operations to load different parts of the same atomicity granule, an earlier load request which requires loading of one part of the atomicity granule to a first destination register may over-read, so that in addition to requesting its part of the atomicity granule from memory, it also requests a second part of the atomicity granule which will be needed for a subsequent load associated with the plural-register-load instruction. As shown in FIG. 15, the second part of the atomicity granule may be allocated into the atomicity data buffer 140, so that when the second load request is processed, it is not necessary to issue another load request to memory, but instead the second load request can obtain the second portion of the atomicity granule from the atomicity data buffer 140 and write that portion to a second destination register.

Hence, as effectively both of the portions of data needed for the earlier and later loads are loaded from memory in response to the same request, the respective loads see a consistent atomic view of memory, so this provides a guarantee of atomicity, avoiding the need for tracking loss-of-atomicity using the RAR buffer (although RAR buffer entries for these loads may still be allocated for the purpose of enforcing memory ordering requirements). Hence, when the atomicity-buffering mode is used, no flush needs to be triggered on detecting loss-of-atomicity according to step 208 of FIG. 10.

One may think that, if the atomicity data buffer 140 is provided to support processing of plural-register-load instructions using the atomicity-buffering mode, then it would not be necessary to track for loss-of-atomicity using the RAR buffer 10 as discussed earlier. However, in practice, some workloads may include a relatively large number of plural-register-load instructions, and so in an out-of-order processor with a relatively large re-ordering window (number of younger instructions which can be re-ordered ahead of the oldest instruction), processing all plural-register-load instructions in atomicity-buffering mode may require an unfeasibly large atomicity data buffer 140 to handle buffering of portions of data for many plural-register-load instructions. The circuit area and power cost of implementing such a large atomicity data buffer 140 may not be considered justified for some micro-architectures.

If the atomicity data buffer 140 is not large enough to handle all plural-register-load instructions, one approach could be that the atomicity-buffering mode may be used only for selected plural-register-load instructions, but not for all plural-register-load instructions. Other plural-register-load instructions can be handled using the cracked mode described above, which incurs a risk of loss of atomicity, and so may require flushing when the loss of atomicity is detected using the RAR buffer.

For example, when one of the oldest N instructions remaining (where either N=1 or N>1) is a plural-registerload instruction, that plural-register-load instruction may be processed according to the atomicity-buffering mode, so that effectively the data for that plural-register-load instruction is loaded at the time of the first load operation associated with that instruction and buffered in buffer 140 for use by subsequent loads of that instruction, to guarantee atomicity and eliminate the risk of snoops between the respective loads triggering a flush/re-execute. However, when a younger instruction than the oldest N instructions is a plural-register-load instruction, then the plural-register-load instruction may be processed according to one of the cracked/non-cracked modes, and if the cracked mode is used, then this may involve tracking of atomicity using the RAR buffer as discussed above. As the oldest instructions are the ones which, if flushed and re-executed, will have the greatest impact on processing performance (as it may require a larger number of younger instructions to be re-executed or stalled), it may be preferable to use the stronger guarantee of atomicity provided by the atomicity-buffering mode for the older instructions in preference to younger instructions. However, by using the cracked mode or non-cracked mode for younger instructions, this preserves capacity of the atomicity data buffer for the older instructions and avoids the need for the atomicity data buffer 140 to become unfeasibly large.

Hence, the combination of the atomicity-buffering mode for older instructions and the cracked mode for younger instructions can provide a better balance between guarantee of forward progress and circuit area/power efficiency. Nevertheless, other implementations may choose to omit support for the atomicity-buffering mode.

In some implementations, the atomicity data buffer 140 could be a shared buffer which is also used for buffering data in response to load operations to unaligned addresses, which do not correspond to an integer multiple of a certain power of 2 block size (e.g. the block size could correspond to a cache line or another size). For unaligned addresses, a single load request may require portions of data to be loaded from two separate blocks, and so an unaligned load may require two separate load requests to be issued to memory, which may "over read" as the memory system may return some data not actually needed by the unaligned load, but which may be part of the same block of data returned from memory as the portion of data actually needed by the unaligned load. As it may be relatively likely that a subsequent load may need the portion of data over-read by the first load, the over-read portion could be allocated into a buffer and then if a subsequent load needs that data it can be read from the buffer without needing to issue a read from memory again. Hence, in some cases the atomicity data buffer 140 could also be used as an unaligned data buffer for unaligned load requests.

The selection of whether to use the cracked mode or non-cracked mode to handle a given load pair instruction can be performed in different ways. Some systems may only support the cracked mode and may never use the non-cracked mode. Other systems could support both modes and may have a mechanism for selecting which mode to use. For some systems the selection of the mode may be statically defined, for example using configuration data which is loaded into a configuration register at boot time.

Other systems may support dynamic selection of whether non-cracked mode or the cracked mode is used, for example based on the bandwidth available at the time of processing a given load pair instruction, or based of performance monitoring counters 142 tracked by the load tracking circuitry 8.

For example, the performance counters could count the number of load pair instructions and the number of single load instructions, and if the number of total load operations (including single loads and load pairs) includes more than a certain threshold fraction of load pair instructions then the cracked mode could be selected, which may be expected to be more efficient because this would enable spare slots 30 as described above in the load pipelines to be populated with single loads even if they are triggered by load pair instructions. On the other hand, if the fraction of total loads triggered by load pair instructions is relatively low then the non-cracked mode could be selected which may make enforcement of atomicity simpler and reduce the likelihood that instructions have to be flushed and re-executed because of a potential loss of atomicity.

Figure 16:
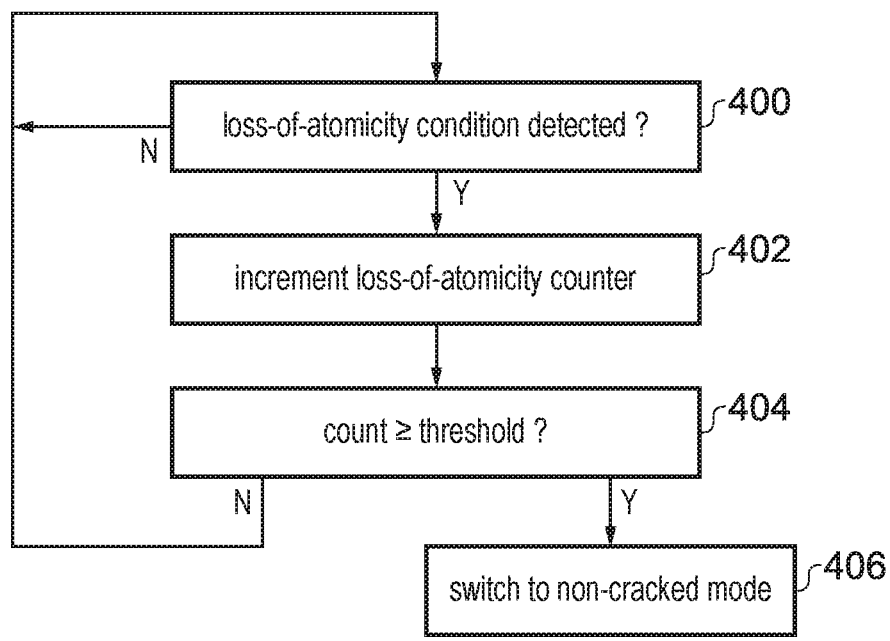
FIG. 16 is a flow diagram showing a method of controlling whether to operating the cracked mode or the non-cracked mode depending on a counter for tracking the number of occurrences of loss-of-atomicity.

FIG. 16 shows a flow diagram showing a particular way of checking for which mode to use. In this example it is assumed at the start of FIG. 16 that the current mode is the cracked mode. At step 400 the load tracking circuitry detects whether loss of atomicity has been detected using the RAR buffer and if not processing continues. When an instance of detecting the loss-of-atomicity condition is detected then at step 402 a loss-of-atomicity counter maintained within the performance counter 142 is incremented. At step 404 it is determined whether the count is greater than a threshold and if so then at step 406 the switch to the non-cracked mode is triggered. The switch to the non-cracked mode could be made for all subsequent plural-register-load instructions, or could be only for the specific instruction which was detected as causing more than the threshold number of loss-of-atomicity events and so is not making forward progress. In contrast, if the count has not yet reached the threshold then the method returns to step 400 to continue monitoring.

In implementations where the system switches to the non-cracked mode for subsequent plural-register-load instructions after detecting more than the threshold number of loss-of-atomicity events, then it can be useful to periodically decrement the count value if the count has not yet reached the threshold. For example, the count value can be decremented every time a certain period has elapsed. This period could be counted in terms of number of processing cycles that have elapsed or in terms of the number of executed total instructions or the number of executed load pair instructions or load instructions in general. By periodically decrementing the counter this ensures that the system does not switch to the non-cracked mode merely because it has been running long enough to go beyond the threshold even if loss of atomicity conditions are relatively rare in terms of frequency.

In implementations where the non-cracked mode is used for a specific plural-register-load instruction that is detected as encountering more than the threshold number of loss-of-atomicity events, then it may be useful to maintain more than one counter, each counter maintained alongside an indication of the instruction identifier of the instruction for which the number of loss-of-atomicity events is being counted. This allows the loss-of-atomicity count to be maintained separately for a number of instructions. With this approach then even if one instruction has its mode of operation switched to the non-cracked mode, other plural-register-load instructions can still be processed in the cracked mode if loss-of-atomicity has not been detected for those instructions.

By triggering a switch to the non-cracked mode when the counter indicates that there have been a relatively high frequency of loss-of-atomicity conditions, then this can enable detection of whether the currently processed instruction workload is such that there is a reasonable amount of interference between the load accesses form the current workload and load accesses being performed on other processing elements, which may increase the risk that the pair instructions need to be flushed and re-executed. If load pair instructions keep needing to be re-executed then this may harm performance and to ensure that forward progress is possible then it may be preferred to switch to the non-cracked mode to guarantee that the load pair instruction can make progress even if this is at the expense of bandwidth utilisation.

Alternatively, other system designers may prefer only to implement the cracked mode and may not support the non-cracked mode. This would have the advantage that any hardware circuit logic needed to support the blocking of a slot 28 in a second pipeline and the reuse of a result bus 26-1 in that reserved pipeline for returning the other part of the load pair data as shown in FIG. 4 can be avoided, which can reduce the complexity of the processor and save circuit area and power. In some cases the system designer may consider that the chances of the same load pair instruction encountering a loss of atomicity condition every time in the cracked mode may be sufficiently low that it is not necessary to support the non-cracked mode as a way of guaranteeing forward progress. If the load pair instruction keeps being retried then eventually there may not be a snoop to the relevant address in the intervening time between the processing of the respective loads for the cracked mode and then forward progress may be achieved. Alternatively, a mechanism for increasing the likelihood that forward progress can be made sooner may be provided (e.g. use of the atomicity-buffering mode for the oldest loads as described above, or that the performance monitoring counters 142 could gather performance indicating information such as the count of the number of times loss of atomicity was detected for load pair instructions, and this could be exposed to software so that the software executing on the pipeline could include an if statement or other conditional functionality which detects whether the performance counter has reached a certain level and if so then switches to an alternative path of program flow which performs the functionality of the load pair instruction using separate single load instructions instead).

Figure 17:
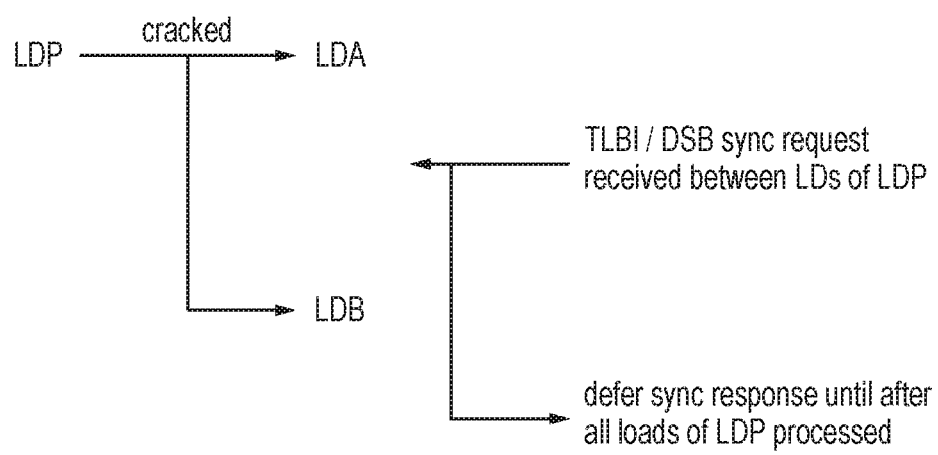
FIG. 17 illustrates deferral of a synchronisation response.

FIG. 17 shows handling of a synchronisation request by the processing circuitry 4. The processing circuitry 4 may receive a synchronisation request from another processing element, requesting that the processing circuitry 4 confirms that a certain event has occurred. For example, when a translation lookaside buffer invalidation is requested to invalidate page table data within a translation lookaside buffer used for address translation, it can be useful to ensure that any instructions using translations based on the old page table data have completed before proceeding with subsequent operations after the translation lookaside buffer invalidation. Hence, for one type of synchronisation request, the event required for the synchronisation response to be returned could be that both the translation lookaside buffer invalidation itself, and any instructions using the old page table data to be invalidated, have completed.

A synchronisation request could also be triggered by a barrier instruction, which may cause the synchronisation request to be issued to request other processing elements to confirm that memory operations preceding the barrier have completed.

In response to the synchronisation request, the processing circuitry 4 may wait for the predetermined event to occur, and then return a synchronisation response confirming that the event has occurred, but the exact timing of sending the synchronisation response may be variable (as long as it is sent after the predetermined event has occurred).

If, as shown in FIG. 17, the synchronisation request was received between processing of the respective loads of a plural-register-load instruction, and the synchronisation response was returned before all of the respective loads are complete, there could be a risk that the other process which is waiting for the synchronisation response could change page table information or other data required for one of the later loads before that load is processed, which could risk a loss of atomicity for the plural-register-load instruction. Therefore, to ensure atomicity for the plural-register-load instruction, if the synchronisation request is received between an earlier processed load and a later processed load for that plural-register-load instruction, then the processing circuitry 4 defers issuing of the synchronisation response until after each of the loads for the plural-register-load instruction is complete.

In the present application, the words "configured to . . . " are used to mean that an element of an apparatus has a configuration able to carry out the defined operation. In this context, a "configuration" means an arrangement or manner of interconnection of hardware or software. For example, the apparatus may have dedicated hardware which provides the defined operation, or a processor or other processing device may be programmed to perform the function. "Configured to" does not imply that the apparatus element needs to be changed in any way in order to provide the defined operation.

Although illustrative embodiments of the invention have been described in detail herein with reference to the accompanying drawings, it is to be understood that the invention is not limited to those precise embodiments, and that various changes and modifications can be effected therein by one skilled in the art without departing from the scope of the invention as defined by the appended claims.

The invention claimed is:

1. An apparatus comprising:
   processing circuitry to issue load operations to load data from memory, where in response to a plural-register-load instruction specifying a plurality of destination registers to be loaded with data from respective target addresses, the processing circuitry is configured to permit a plurality of load operations corresponding to the plural-register-load instruction to be issued as separate load operations; and
   load tracking circuitry configured to maintain tracking information for one or more issued load operations; in which:
   when the plural-register-load instruction is subject to an atomicity requirement and the plurality of load operations are issued as separate load operations, the load tracking circuitry is configured to:
      detect, based on the tracking information, whether a loss-of-atomicity condition has occurred for the plurality of load operations corresponding to the plural-register-load instruction, the loss-of-atomicity condition comprising a condition indicative of a risk that, between processing of an earlier processed load operation and processing of a later processed load operation of the plurality of load operations, data associated with an address of the earlier processed load operation has changed; and
      request re-processing of the plural-register-load instruction when the loss-of-atomicity condition is detected;

wherein the load tracking circuitry is configured to detect occurrence of the loss-of-atomicity condition when a coherency snoop request specifying a snoop address corresponding to the address of the earlier processed load operation is detected between processing of the earlier processed load operation and processing of the later processed load operation.

2. The apparatus according to claim 1, comprising an atomicity data buffer; in which:
   the processing circuitry is configured to support an atomicity-buffering-mode of processing the plurality of load operations corresponding to the plural-register-load instruction; and
   when the plurality of load operations are issued as separate load operations and processed in the atomicity-buffering mode:
      in response to the earlier processed load operation, the processing circuitry is configured to load at least one data word which comprises a first portion required for processing of the earlier processed load operation and a second portion required for processing of the later processed load operation, and to allocate the second portion into the atomicity data buffer; and
      in response to the later processed load operation which requires the second portion, the processing circuitry is configured to obtain the second portion from the atomicity data buffer.

3. The apparatus according to claim 2, in which the processing circuitry is configured to process the plurality of load operations corresponding to the plural-register-load instruction in the atomicity-buffering mode when the plurality of load operations include an oldest pending load operation remaining to be processed.

4. The apparatus according to claim 1, in which the respective target addresses for the plural-register-load instruction are addresses of contiguous blocks of address space.

5. The apparatus according to claim 1, in which the processing circuitry is configured to support:
   a cracked mode of processing the plural-register-load instruction, in which the processing circuitry is configured to crack the plural-register-load instruction into the plurality of load operations to be issued as separate load operations; and
   a non-cracked mode of processing the plural-register load instruction, in which the processing circuitry is configured to:
      issue, in response to the plural-register-load instruction, a single load operation to load a combined block of data, the combined block of data including portions of data to be loaded to each of the destination registers of the plural-register load instruction; and
      allocate a plurality of load-data-returning paths for use in response to the single load operation, each of the plurality of load-data-returning paths allocated for returning the data required to be loaded to a respective one of the destination registers.

6. The apparatus according to claim 5, comprising counting circuitry to:
   count a number of occurrences of the loss-of-atomicity condition when the processing circuitry is in the cracked mode, and
   request that the processing circuitry switches to the non-cracked mode when the number of occurrences of the loss-of-atomicity condition exceeds or reaches a predetermined threshold.

7. The apparatus according to claim 1, in which in response to a synchronisation request requesting confirmation that a predetermined event has occurred, the processing circuitry is configured to provide a synchronisation response when the predetermined event has occurred; and
   when the synchronisation request is received between processing of the earlier processed load operation and processing of the later processed load operation, the processing circuitry is configured to defer providing the synchronisation response until after the later processed load operation has been processed.

8. The apparatus according to claim 1, in which the plural-register-load instruction is a load-pair instruction for which the number of destination registers is 2.

9. The apparatus according to claim 1, in which the processing circuitry comprises N load pipelines to process load operations in parallel, where N is an odd integer greater than or equal to 3.

10. An apparatus comprising:
    processing circuitry to issue load operations to load data from memory, where in response to a plural-register-load instruction specifying a plurality of destination registers to be loaded with data from respective target addresses, the processing circuitry is configured to permit a plurality of load operations corresponding to the plural-register-load instruction to be issued as separate load operations; and
    load tracking circuitry configured to maintain tracking information for one or more issued load operations; in which:
    when the plural-register-load instruction is subject to an atomicity requirement and the plurality of load operations are issued as separate load operations, the load tracking circuitry is configured to:
       detect, based on the tracking information, whether a loss-of-atomicity condition has occurred for the plurality of load operations corresponding to the plural-register-load instruction, the loss-of-atomicity condition comprising a condition indicative of a risk that, between processing of an earlier processed load operation and processing of a later processed load operation of the plurality of load operations, data associated with an address of the earlier processed load operation has changed; and
       request re-processing of the plural-register-load instruction when the loss-of-atomicity condition is detected;
    wherein the load tracking circuitry is configured to maintain, as the tracking information, a tracking structure comprising one or more tracking entries, each tracking entry specifying at least:
       an instruction identifier associated with a processed load operation;
       an address of the processed load operation; and
       a hazard indication indicative of whether a hazard condition has been detected for the processed load operation.

11. The apparatus according to claim 10, in which when the plural-register-load instruction is processed with the plurality of load operations issued as separate load operations, the processing circuitry is configured to allocate the same instruction identifier to each of the plurality of load operations corresponding to the plural-register-load instruction.

12. The apparatus according to claim 10, in which the load tracking circuitry is configured to allocate a tracking entry in the tracking structure for a given load operation corresponding to the plural-register-load instruction, in response to processing of the given load operation.

13. The apparatus according to claim 10, in which the load tracking circuitry is configured to set the hazard indication for a given tracking entry of the tracking structure to indicate that the hazard condition has been detected, in response to detecting a coherency snoop request specifying a snoop address corresponding to the address specified by the given tracking entry.

14. The apparatus according to claim 10, in which in response to processing of a given load operation corresponding to the plural-register-load instruction associated with a given instruction identifier, the load tracking circuitry is configured to detect occurrence of the loss-of-atomicity condition when the tracking structure is detected as already including a tracking entry specifying said given instruction identifier for which the hazard indication indicates that the hazard condition has been detected.

15. The apparatus according to claim 14, in which in response to detecting the loss-of-atomicity condition, the load tracking circuitry is configured to request that the processing circuitry re-processes at least a given plural-register-load instruction identified by the given instruction identifier associated with the given load operation which caused the loss-of-atomicity condition to be detected and one or more subsequent instructions younger than the given plural-register-load instruction.

16. The apparatus according to claim 10, in which the load tracking circuitry is also configured to use the tracking information to determine:
  whether at least one load operation has been issued in disagreement with a memory ordering requirement; and
  when it is determined that the at least one load operation has been issued in disagreement with the memory ordering requirement, whether to re-issue one or more issued load operations or to continue issuing load operations despite disagreement with the memory ordering requirement.

17. The apparatus according to claim 10, in which in response to processing of a given load operation associated with a given instruction identifier identifying a given instruction, the load tracking circuitry is configured to detect a memory ordering violation when the tracking structure includes a hazarding entry for which:
  the instruction identifier specified by the hazarding entry corresponds to a younger instruction than the given instruction;
  an address specified by the hazarding entry corresponds to an address of the given load operation; and
  the hazard indication specified by the hazarding entry indicates that the hazard condition has been detected.

18. The apparatus according to claim 17, in which in response to detecting the memory ordering violation, the load tracking circuitry is configured to request that the processing circuitry re-processes at least the younger instruction identified by the instruction identifier specified by the hazarding entry and one or more subsequent instructions younger than the younger instruction, and to permit processing to continue without re-issuing the given instruction.

19. A data processing method comprising:
  in response to a plural-register-load instruction specifying a plurality of destination registers to be loaded with data from respective target addresses, issuing a plurality of load operations corresponding to the plural-register-load instruction, using processing circuitry which permits the plurality of load operations to be issued as separate load operations; and
  maintaining tracking information for one or more issued load operations; in which:
  when the plural-register-load instruction is subject to an atomicity requirement and the plurality of load operations are issued as separate load operations, the method comprises:
    detecting, based on the tracking information, whether a loss-of-atomicity condition has occurred for the plurality of load operations corresponding to the plural-register-load instruction, the loss-of-atomicity condition comprising a condition indicative of a risk that, between processing of an earlier processed load operation and processing of a later processed load operation of the plurality of load operations, data associated with an address of the earlier processed load operation has changed;
    requesting re-processing of the plural-register-load instruction when the loss-of-atomicity condition is detected; and
    detecting an occurrence of the loss-of-atomicity condition when a coherency snoop request specifying a snoop address corresponding to the address of the earlier processed load operation is detected between processing of the earlier processed load operation and processing of the later processed load operation.

* * * * *